(12) United States Patent
Furutani

(10) Patent No.: US 12,482,489 B2
(45) Date of Patent: Nov. 25, 2025

(54) SUSPENSION ASSEMBLY AND DISK DRIVE

(71) Applicants: Kabushiki Kaisha Toshiba, Tokyo (JP); Toshiba Electronic Devices & Storage Corporation, Tokyo (JP)

(72) Inventor: Kazuhiro Furutani, Yokosuka Kanagawa (JP)

(73) Assignees: Kabushiki Kaisha Toshiba, Kawasaki (JP); Toshiba Electronic Devices & Storage Corporation, Kawasaki (JP)

(*) Notice: Subject to any disclaimer, the term of this patent is extended or adjusted under 35 U.S.C. 154(b) by 0 days.

(21) Appl. No.: 18/418,869

(22) Filed: Jan. 22, 2024

(65) Prior Publication Data

US 2025/0095675 A1 Mar. 20, 2025

(30) Foreign Application Priority Data

Sep. 19, 2023 (JP) ................................. 2023-151076

(51) Int. Cl.
 *G11B 5/48* (2006.01)
 *G11B 5/60* (2006.01)

(52) U.S. Cl.
 CPC .......... *G11B 5/4833* (2013.01); *G11B 5/6082* (2013.01)

(58) Field of Classification Search
 None
 See application file for complete search history.

(56) References Cited

U.S. PATENT DOCUMENTS

| | | | | |
|---|---|---|---|---|
| 5,060,434 A | * | 10/1991 | Allison | E04B 2/7411 52/745.12 |
| 5,237,475 A | * | 8/1993 | Kazama | G11B 11/1058 |
| 5,608,590 A | * | 3/1997 | Ziegler | G11B 5/4826 360/245.1 |
| 5,652,684 A | * | 7/1997 | Harrison | G11B 5/4826 360/245.1 |
| 5,661,619 A | * | 8/1997 | Goss | G11B 21/16 360/245.1 |
| 5,786,961 A | * | 7/1998 | Goss | G11B 5/4826 360/245.1 |
| 5,880,908 A | * | 3/1999 | Shiraishi | G11B 5/4826 360/234.6 |
| 5,901,430 A | * | 5/1999 | Ziegler | G11B 5/4833 29/603.07 |
| 5,999,369 A | * | 12/1999 | Shimizu | G11B 5/4813 |
| 6,078,472 A | * | 6/2000 | Mitoh | G11B 5/4853 |
| 6,088,192 A | * | 7/2000 | Riener | G11B 33/10 |
| 6,366,430 B1 | | 4/2002 | Narayan et al. | |

(Continued)

*Primary Examiner* — William J Klimowicz
(74) *Attorney, Agent, or Firm* — Kim & Stewart LLP

(57) ABSTRACT

According to one embodiment, a suspension assembly includes a support plate, a wiring member provided on the support plate and including a head-mount surface, and a support protrusion which includes a first area having a first height and a second area having a second height smaller than the first height, and a magnetic head including a slider having a placement surface and a medium-facing surface opposed to the placement surface and a head portion provided at the slider, the placement surface being placed on the support protrusion and fixed on the head-mount surface, the medium-facing surface being tilted with respect to the head-mount surface such that a side on the second area is lower than a side on the second area.

15 Claims, 16 Drawing Sheets

(56) References Cited

U.S. PATENT DOCUMENTS

| | | | | |
|---|---|---|---|---|
| 7,027,141 | B2* | 4/2006 | Girard | G11B 5/5521 |
| | | | | 356/624 |
| 7,151,650 | B2* | 12/2006 | Lee | G11B 5/6005 |
| | | | | 360/234.6 |
| 7,230,800 | B2 | 6/2007 | Hirano et al. | |
| 9,558,768 | B1* | 1/2017 | Tsuchiya | G11B 5/4826 |
| 9,830,938 | B1* | 11/2017 | Aoki | G11B 5/4833 |
| 9,953,666 | B2 | 4/2018 | Unger et al. | |
| 10,720,179 | B1* | 7/2020 | Sedklang | G11B 5/4826 |
| 11,557,318 | B1* | 1/2023 | Lo | G11B 5/4826 |
| 11,854,582 | B2* | 12/2023 | Nishida | G11B 5/4853 |
| 2003/0151854 | A1* | 8/2003 | Lee | G11B 5/6005 |
| | | | | 360/234.6 |
| 2008/0094756 | A1* | 4/2008 | Makino | G11B 5/4826 |
| | | | | 360/245.9 |
| 2021/0225394 | A1* | 7/2021 | Suzuki | G11B 5/54 |
| 2023/0197109 | A1* | 6/2023 | Nishida | G11B 5/4826 |
| | | | | 360/245.3 |

* cited by examiner

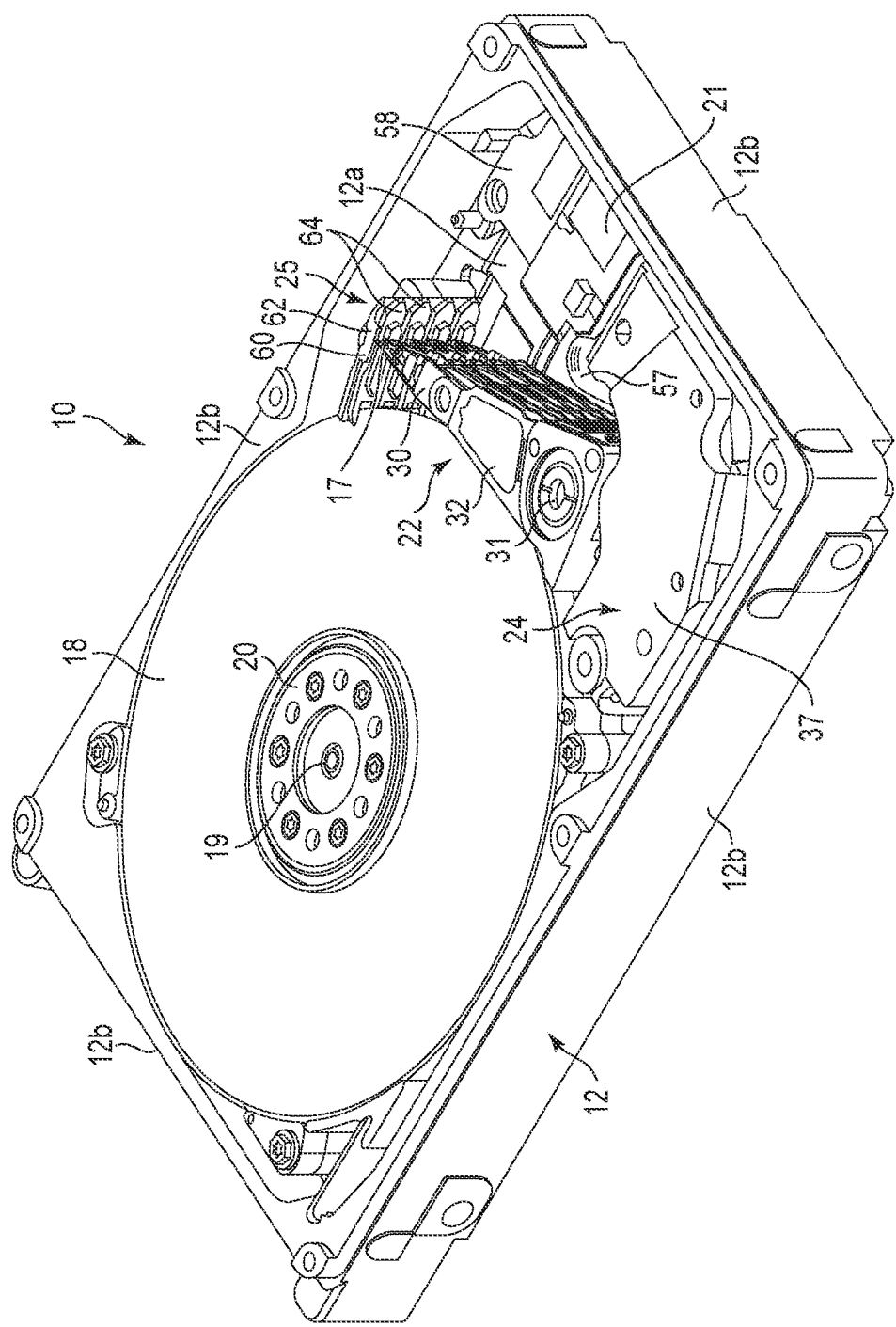
F I G. 1

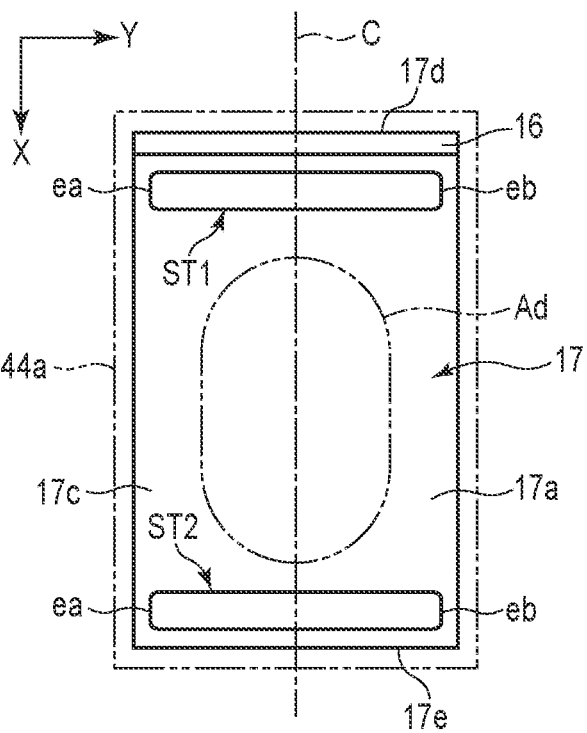
F I G. 9A
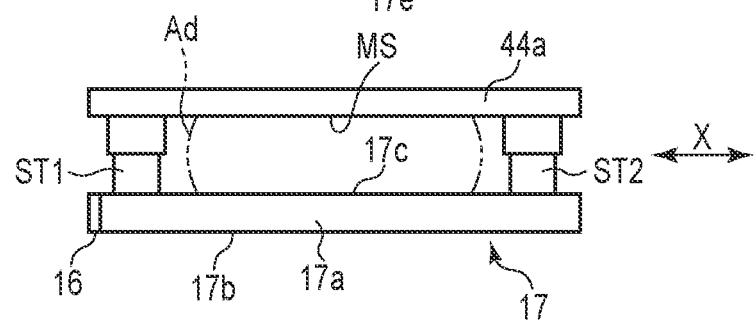
F I G. 9B
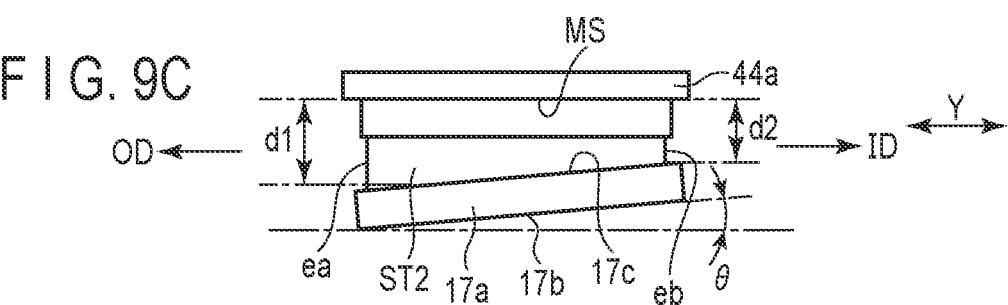
F I G. 9C

SUSPENSION ASSEMBLY AND DISK DRIVE

CROSS-REFERENCE TO RELATED APPLICATIONS

This application is based upon and claims the benefit of priority from Japanese Patent Application No. 2023-151076, filed Sep. 19, 2023, the entire contents of which are incorporated herein by reference.

FIELD

Embodiments described herein relate generally to a suspension assembly and a disk drive comprising the same.

BACKGROUND

A hard disk drive (HDD) serving as a disk device comprises, for example, a plurality of magnetic disks arranged in a housing so as to be freely rotatable, a plurality of magnetic heads that read information from and write information to the magnetic disks, and a head actuator that supports the magnetic heads to be movable with respect to the magnetic disks. The head actuator includes a suspension including a gimbal portion which can be freely displaced. The magnetic heads are mounted on a slider-mounted surface of the gimbal portion. In addition, the HDD usually comprises a ramp load mechanism that holds the magnetic head in an unload position when not operated. When the HDD is operated, the HDD is moved from a ramp of the ramp load mechanism to a loaded position on the magnetic disk.

In the HDD comprising the ramp load mechanism, the posture of the magnetic head during the loading operation needs to be tilted slightly in a roll direction in order to reduce the risk of contact between the magnetic head and the recording medium during the loading operation. For this reason, the gimbal portion of the suspension is bent such that the slider-mounted surface is inclined in the roll direction.

However, the bending process to tilt in the roll direction is difficult to obtain a desired tilt since an average value easily deviates from a target value.

BRIEF DESCRIPTION OF THE DRAWINGS

FIG. 1 is a perspective view showing a hard disk drive (HDD) according to an embodiment.

FIG. 9A is a plan view schematically showing a magnetic head and a head support portion of an HDD according to a second embodiment.

FIG. 9B is a side view showing the magnetic head and the head support portion viewed from a Y direction (roll direction).

FIG. 9C is a side view showing the magnetic head and the head support portion viewed from an X direction (pitch direction).

DETAILED DESCRIPTION

Figure 2:
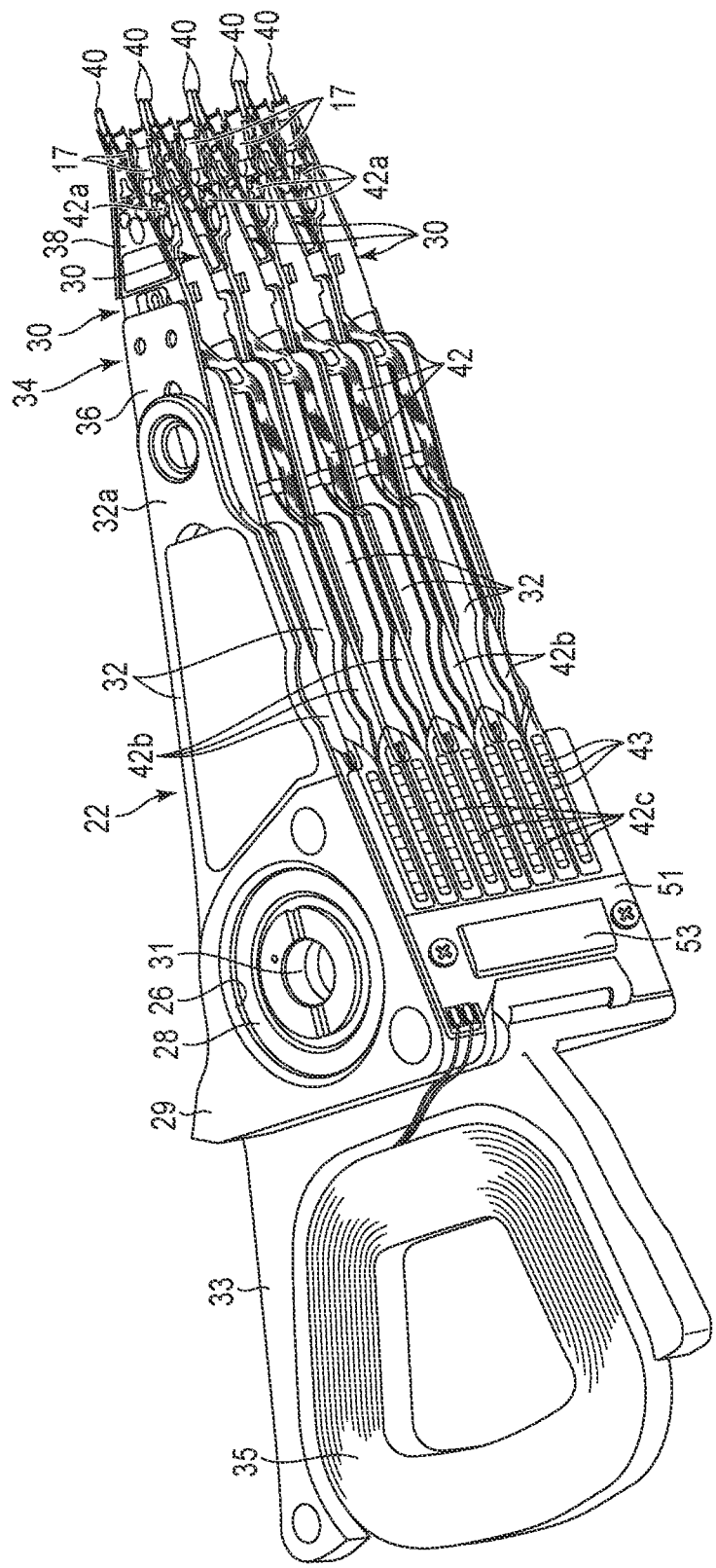
FIG. 2 is a perspective view showing an actuator assembly of the HDD.

Various embodiments will be described hereinafter with reference to the accompanying drawings. In general, according to one embodiment, a suspension assembly comprises: a support plate; a wiring member provided on the support plate and including a head-mount surface, and a support protrusion which includes a first area having a first height and a second area having a second height smaller than the first height; and a magnetic head including a slider having a placement surface and a medium-facing surface opposed to the placement surface and a head portion provided at the slider, the placement surface being placed on the support protrusion and fixed on the head-mount surface, the medium-facing surface being tilted with respect to the head-mount surface such that a side on the second area is lower than a side on the second area.

The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. Besides, in the specification and drawings, the same elements as those described in connection with preceding drawings are denoted by like reference numbers, and a detailed description thereof is omitted unless necessary.

First Embodiment

A hard disk drive (HDD) according to a first embodiment will be described in detail as a disk drive.

FIG. 1 is a perspective view showing the HDD according to the first embodiment with a top cover detached.

As shown in the drawing, the HDD comprises a housing 10. The housing 10 comprises a base 12 shaped in a rectangular box which is open on its upper side, and a top cover (not shown). The base 12 comprises a rectangular bottom wall 12a and sidewalls 12b erected along the edges of the bottom wall 12a, and is formed of aluminum and molded integrally. The top cover is formed of, for example, stainless steel, in a rectangular plate shape, and is screwed to the side walls 12b of the base 12 with a plurality of screws.

A plurality of magnetic disks 18 that are disk-shaped recording media, and a spindle motor 19 that supports and rotates the magnetic disks 18 are provided inside the housing 10. The spindle motor 19 is arranged on the bottom wall 12a. Each of the magnetic disks 18 includes a substrate shaped in a disk having a diameter of, for example, 95 mm (3.5 inches) and formed of a non-magnetic material, for example, glass or aluminum, and magnetic recording layers formed on an upper surface (first surface) and a lower surface (second surface) of the substrate. The magnetic disk 18 is fitted coaxially in a hub (not shown) of the spindle motor 19, and is further clamped by a clamp spring 20. The magnetic disk 18 is thereby supported in a state of being located parallel to the bottom wall 12a of the base 12. The plurality of magnetic disks 18 are rotated at a predetermined number of revolutions by the spindle motor 19.

In the embodiment, for example, four magnetic disks 18 are arranged in the housing 10, but the number of magnetic disks 18 is not limited to this, and may be three or less, or five or more.

A plurality of magnetic heads 17 recording information on the magnetic disks 18 and reproducing the information, and an actuator assembly 22 supporting the magnetic heads 17 to be freely movable with respect to the magnetic disks 18, are provided in the housing 10. In addition, a voice coil motor (VCM) 24 which rotates and positions the actuator assembly 22, a ramp load mechanism 25 which holds the magnetic heads 17 at an unload position separated from the magnetic disks 18 when the magnetic heads 17 are moved to the outermost circumference of the magnetic disks 18, and a board unit (FPC unit) 21 on which electronic components such as conversion connectors are mounted, are provided in the housing 10.

A printed circuit board (not shown) is screwed to an outer surface of the bottom wall 12a of the base 12. The printed circuit board constitutes a control unit which controls operations of the spindle motor 19 and which controls operations of the VCM 24 and the magnetic heads 17 via the board unit 21.

FIG. 2 is a perspective view showing the actuator assembly 22. As shown in the drawing, the actuator assembly 22 comprises an actuator block 29 including a through hole 26, a bearing unit 28 (unit bearing) 28 provided in the through hole 26, a plurality of, for example, five arms 32 extending from the actuator block 29, suspension assemblies 30 attached to the respective arms 32, and the magnetic heads 17 supported on the suspension assemblies 30. The actuator block 29 is supported to be freely rotatable around a support shaft (axis) 31 erected on the bottom wall 12a, by the bearing unit 28.

In the embodiment, the actuator block 29 and five arms 32 are formed of aluminum or the like and molded integrally to constitute a so-called E block. The arms 32 are formed in a shape of, for example, an elongated flat plate, and extend from the actuator block 29 in a direction orthogonal to the support shaft 31. Five arms 32 are provided parallel and spaced apart from each other.

The actuator assembly 22 includes a support frame 33 extending from the actuator block 29 in a direction opposite to the arms 32. A voice coil 35 which constitutes part of the VCM 24 is supported on the support frame 33. As shown in FIG. 1, the voice coil 35 is located between a pair of yokes 37 one of which is fixed on the base 12, and constitutes the VCM 24 together with these yokes 37 and magnets fixed to the yokes.

As shown in FIG. 2, the actuator assembly 22 comprises eight suspension assemblies 30, each supporting the magnetic head 17. The suspension assemblies 30 are attached to distal portions 32a of the arms 32, respectively. The plurality of suspension assemblies 30 include up-head suspension assemblies supporting the magnetic heads 17 upwardly and down-head suspension assemblies supporting the magnetic heads 17 downwardly. The up-head suspension assembly and down-head suspension assembly are constituted by arranging the suspension assemblies 30 of the same structure upside down.

In the embodiment, in FIG. 2, the down-head suspension assembly 30 is attached to the uppermost arm 32 and the up-head suspension assembly 30 is attached to the lower-most arm 32. The up-head suspension assembly 30 and the down-head suspension assembly 30 are attached to each of three middle arms 32.

Figure 3:
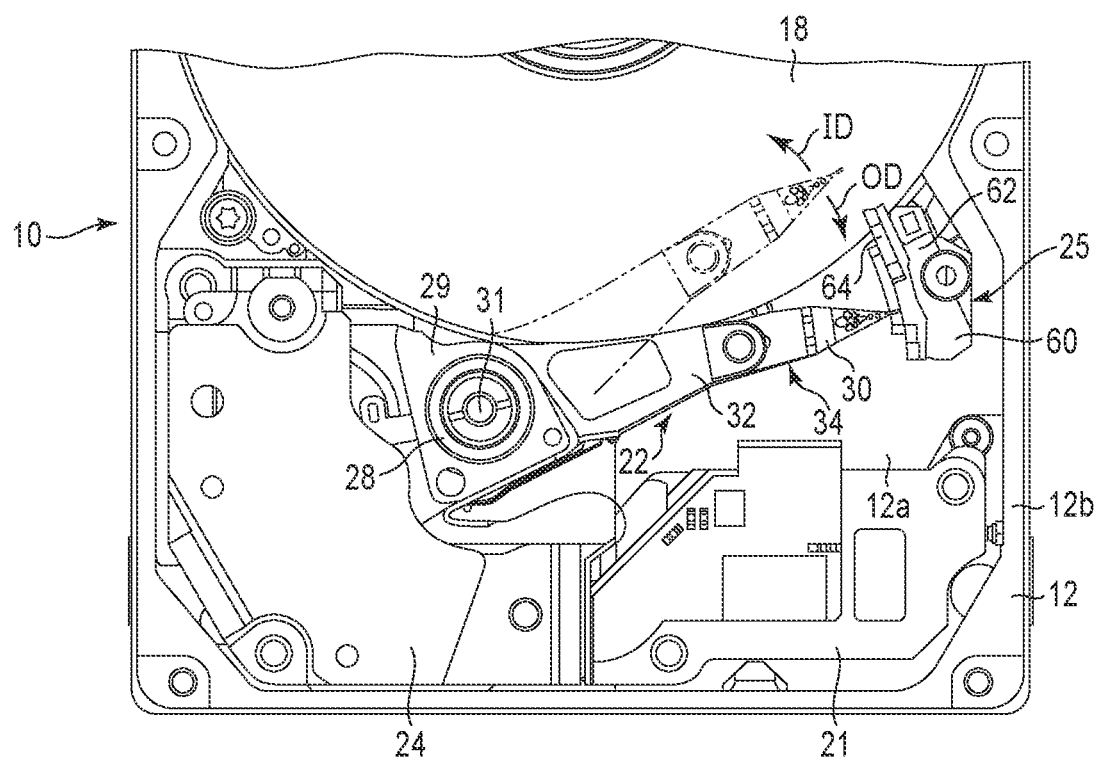
FIG. 3 is a plan view showing an actuator assembly installation area of the HDD.

FIG. 3 is a plan view showing an area on the actuator assembly side of the HDD.

As shown in FIG. 1 and FIG. 3, the actuator assembly 22 is supported to be freely rotatable around the support shaft 31 in a state in which the actuator assembly 22 and the FPC unit 21 are built in the base 12. The support shaft 31 is erected on the bottom wall 12a of the base 12. Each magnetic disk 18 is located between two suspension assemblies 30.

The board unit 21 integrally includes a substantially rectangular base portion 58, an elongated strip-shaped relay portion 57 extending from the base portion 58, and a wiring board 51 provided continuously at a distal end of the relay portion 57. The base portion 58, the relay portion 57, and the wiring board 51 are formed by a flexible printed circuit board (FPC). The base 58 is arranged on the bottom wall 12a of the base 12, and the wiring board 51 is attached to the installation surface of the actuator block 29.

The ramp load mechanism 25 includes a ramp 60 installed on the base 12 and a tab 40 that can be engaged with the ramp 60. As described above, the tab 40 is provided at a distal end of the load beam 38 of the suspension assembly 30. The ramp 60 is fixed to the bottom wall 12a of the base 12 and is located near a peripheral portion of the magnetic disk 18. The ramp 60 comprises a block-shaped ramp body 62. Eight guide surfaces (guides) 64 that support and guide the tabs 40 on the eight suspension assemblies 30, respectively, are formed on one side portion of the ramp body 62.

As shown in FIG. 3, a direction inward in the radial direction toward the center of the magnetic disk 18 is defined as an inward direction ID, and a direction outward in the radial direction is defined as an outward direction OD. When the HDD is in operation, the actuator assembly 22 is rotated around the support shaft 31 in the inward direction ID, by the VCM 24, and the plurality of magnetic heads 17 are moved to desired seek positions in a state of being opposed to the surfaces of the respective magnetic disks 18. When the HDD is not in operation, the actuator assembly 22 is rotated in the outward direction OD to the unload position where the magnetic heads 17 are located outside the outermost circumference of the magnetic disks 18, and the plurality of tabs 40 of the suspension assembly 30 ride up on the guide surfaces 64 of the corresponding ramps 60, respectively. The magnetic heads 17 are thereby held in the unload positions separated from the magnetic disks 18 by the ramps 60.

Next, an example of the suspension assembly 30 will be described in detail.

Figure 4:
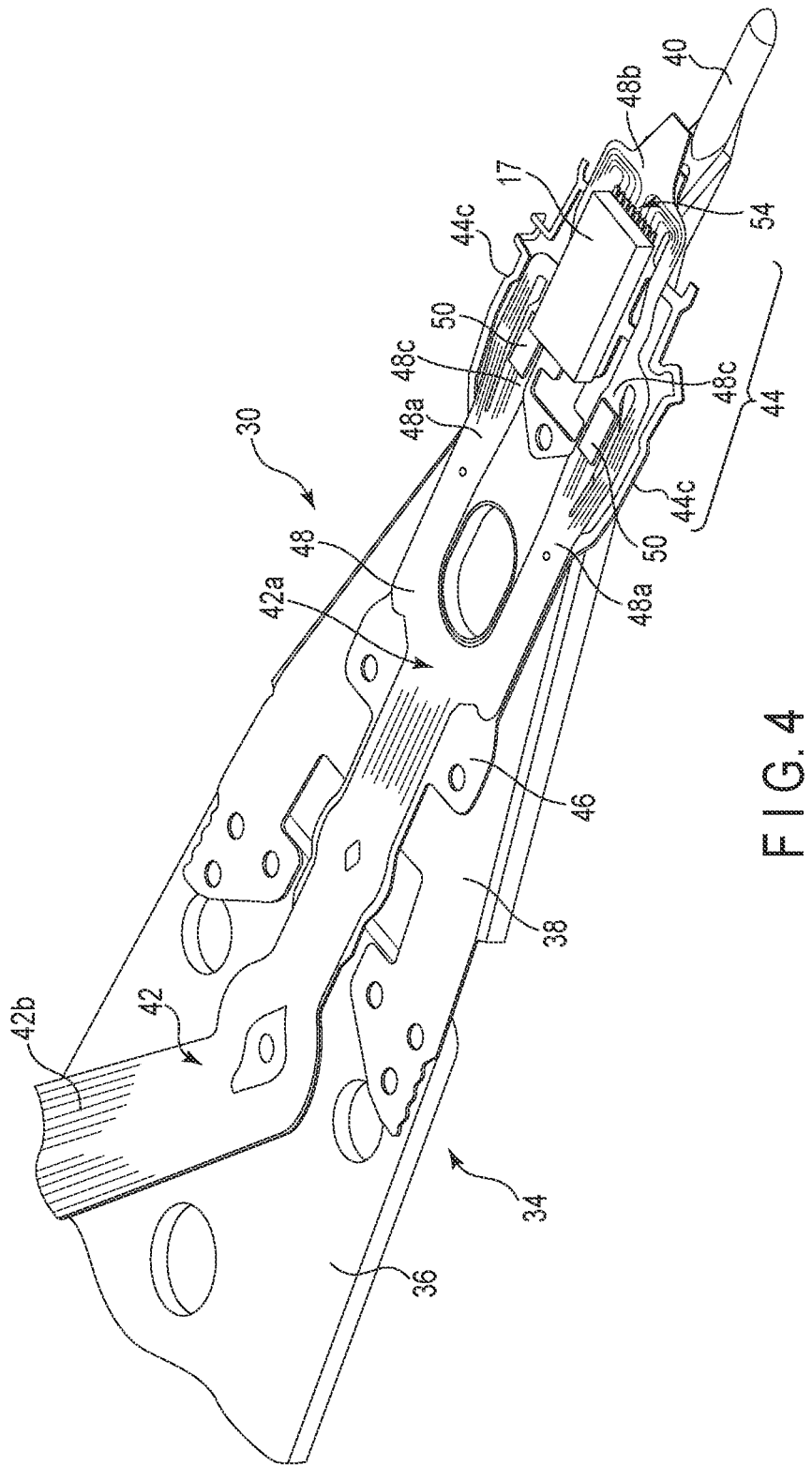
FIG. 4 is a perspective view showing a head suspension assembly of the actuator assembly.
Figure 5:
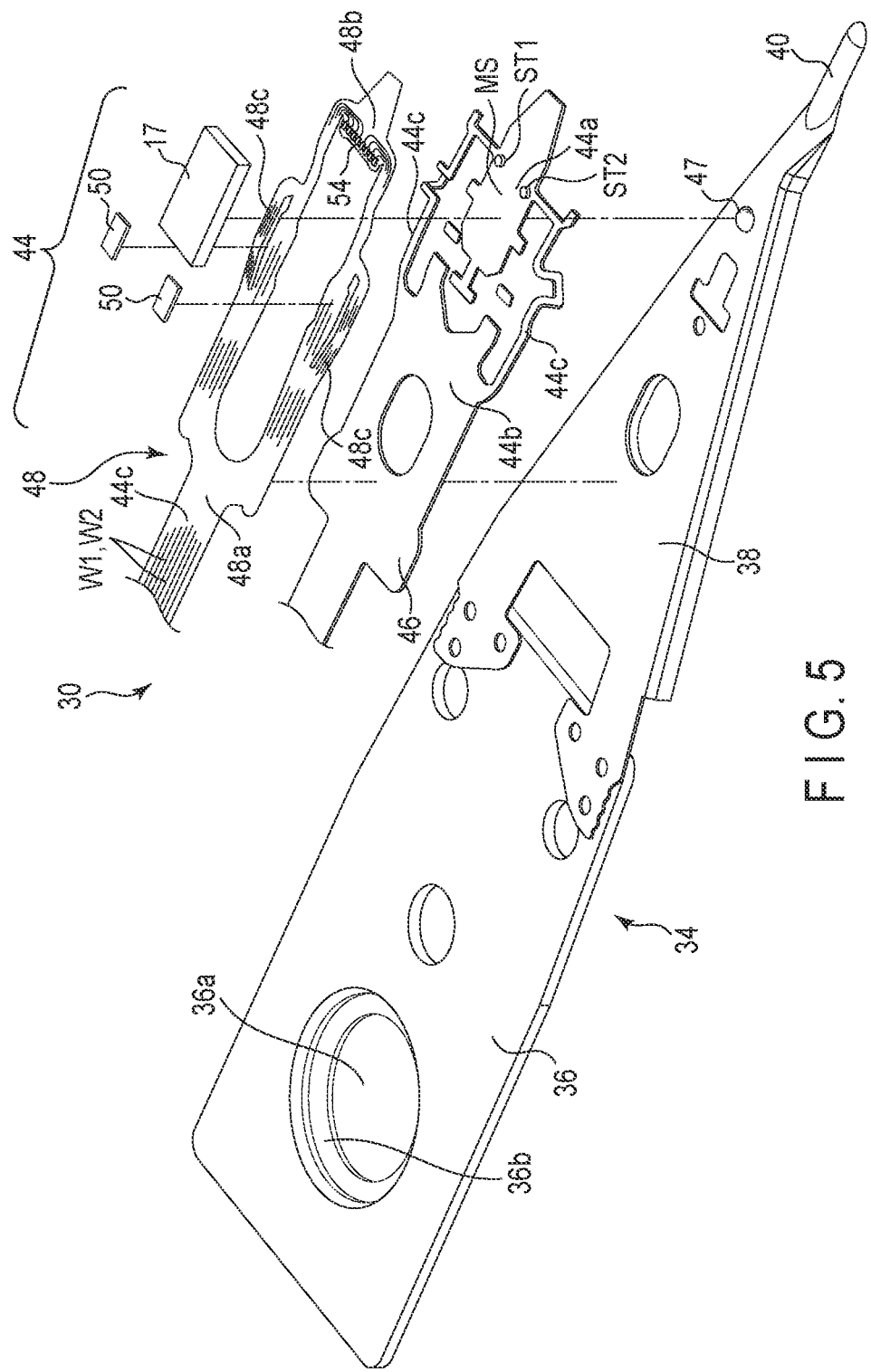
FIG. 5 is an exploded perspective view showing the head suspension assembly.
Figure 6:
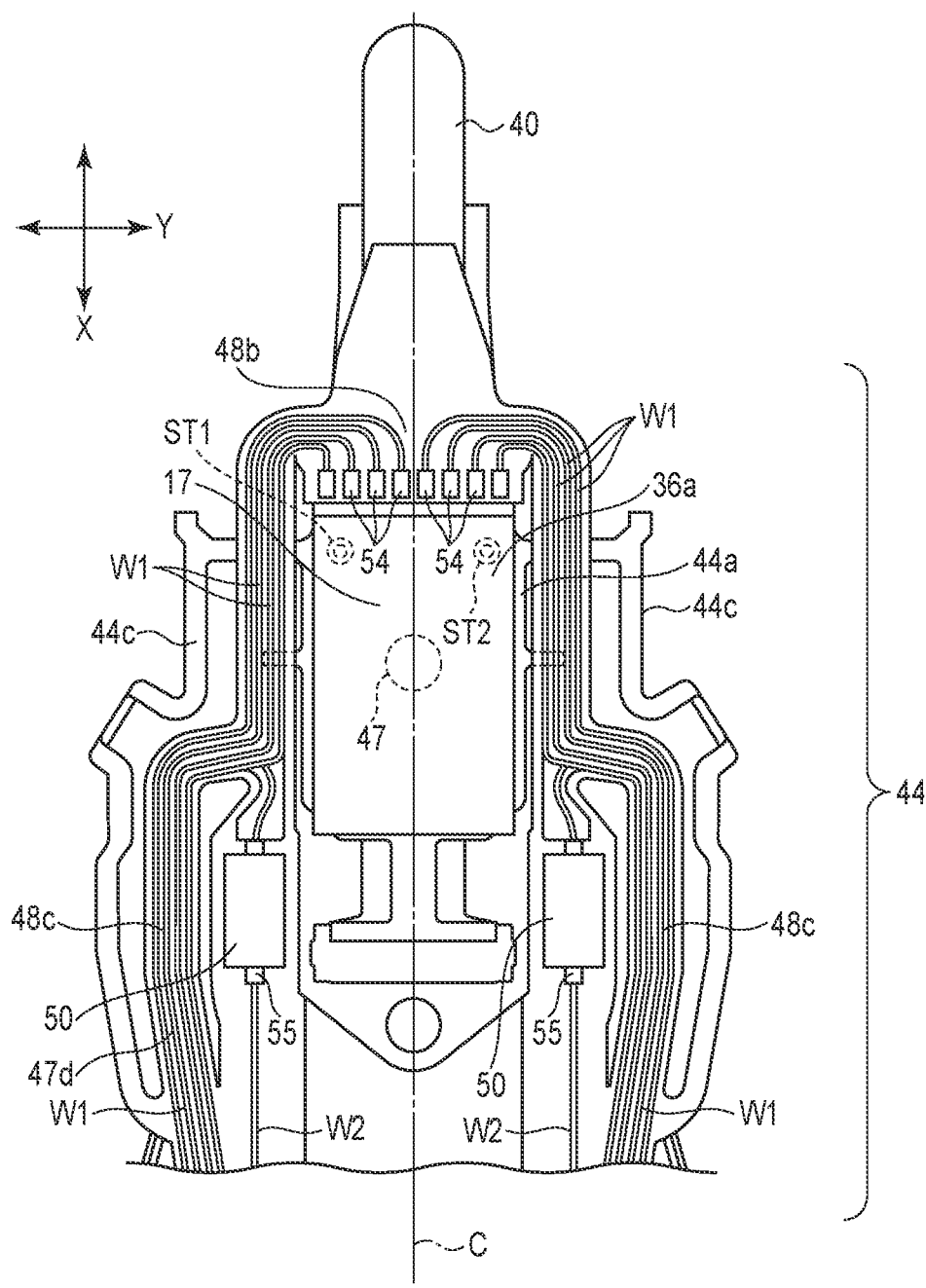
FIG. 6 is a plan view showing a distal portion of the head suspension assembly.

FIG. 4 is a perspective view showing the suspension assembly, FIG. 5 is an exploded perspective view showing the suspension assembly, and FIG. 6 is a plan view showing the distal portion of the suspension assembly.

As shown in FIG. 4 and FIG. 5, each suspension assembly 30 includes a suspension 34 extending from the arm 32, and the magnetic head 17 is attached to the distal portion of the suspension 34. Incidentally, a combination of the magnetic head 17 and the suspension assembly 30 supporting the magnetic heads 17 is referred to as a head suspension assembly.

The suspension 34, which functions as a support plate, includes a rectangular base plate 36 formed of a metal plate having a thickness of several hundreds of microns, and a load beam 38 shaped in an elongated leaf spring and formed of a metal plate having a thickness of several tens of microns. The load beam 38 has its proximal portion arranged to overlap with the distal portion of the base plate 36, and is fixed to the base plate 36 by welding a plurality of parts. The distal portion of the load beam 38 constitutes the distal portion of the support plate, and a proximal portion of the load beam 38 and the base plate 36 constitute a proximal portion of the support plate. The proximal potion of the load beam 38 is formed to have a width substantially equal to that of the base plate 36. A rod-shaped tab 40 is provided to protrude at the distal portion of the load beam 38.

The base plate 36 includes a circular opening 36a at its proximal portion and an annular protrusion 36b located in a surrounding of the opening 36a. The base plate 36 is fastened to the distal portion 32a of the arm 32 by fitting the protrusion 36b in a circular caulking hole (not shown) formed in a caulking seat surface of the arm 32 and caulking the protrusion 36b. The distal end of the base plate 36 may be fixed to the distal portion 32a of the arm 32 by laser welding, spot welding, or adhesion.

The suspension assembly 30 includes an elongated strip-shaped flexure (wiring member) 42 for transmitting record signals and reproduction signals, and drive signals of the piezoelectric elements, and a pair of piezoelectric elements (for example, PZT elements) 50 mounted on the flexure 42. As shown in FIG. 2 and FIG. 4, the flexure 42 includes a distal side portion 42a arranged on the load beam 38 and the base plate 36, a proximal side portion 42b extending outward from the side edge of the base plate 36 and extending to the actuator block 29 along the side edge of the arm 32, and a connection end portion 42c extending from the proximal side portion 42b. The connection end portion 42c includes a plurality of connection pads (electrode pads) 43 provided side by side. These connection pads 43 are electrically joined to connection terminals of the wiring board 51 installed in the actuator block 29.

As shown in FIG. 4 and FIG. 5, the distal portion of the flexure 42 is located on the distal portion of the load beam 38 to constitute a gimbal portion 44 which functions as an elastic support portion. The magnetic head 17 is placed and fixed on the gimbal portion 44, and is supported on the load beam 38 via the gimbal portion 44. A pair of piezoelectric elements 50 serving as drive elements are mounted on the gimbal portion 44 and are arranged near the magnetic head 17.

The flexure 42 includes a metal sheet (metal plate) 46 formed of stainless steel or the like, which serves as a base, and a strip-shaped stacked layer member (flexible printed circuit board: FPC) 48 affixed or fixed onto the metal sheet 46, to form an elongated stacked layer plate. The stacked layer member (FPC) 48 includes a base insulating layer (first insulating layer), most of which is fixed to the metal sheet 46, a conductive layer (wiring pattern) formed on the base insulating layer and constituting a plurality of signal lines and drive lines and a plurality of connection pads, and a cover insulating layer (second insulating layer) stacked on the base insulating layer to cover the conductive layer. The metal sheet 46 is affixed onto the surface of the load beam 38 and the base plate 36 or subjected to spot welding at a plurality of welding points, at the distal side portion 42a of the flexure 42.

At the gimbal portion 44, the metal sheet 46 integrally includes a substantially rectangular tongue portion (support portion) 44a located on the distal side, a substantially rectangular proximal portion 44b located on the proximal side with space sandwiched between the proximal portion 44b and the tongue portion 44a, and a pair of elastically deformable outriggers (link portions) 44c each connecting the proximal portion 44b with the tongue portion 44a. A fixed pad portion 44*e* is located between a connection frame 44*d* and the tongue portion 44*a*.

As shown in FIG. 4, FIG. 5, and FIG. 6, the tongue portion 36*a* is formed to have a size and shape which allow the magnetic head 17 to be placed thereon, and formed in, for example, a substantially rectangular shape. In other words, one surface of the tongue portion 44*a* constitutes a head-mount surface (hereinafter referred to as a "mounted surface") MS on which the magnetic head 17 is mounted. The tongue portion 44*a* is arranged such that a central axis of its width direction corresponds to a central axis C (see FIG. 6) of the suspension 34. Support protrusions (often referred to as standoffs) ST1 and ST2, which will be described below, are provided on a mounted surface MS.

A substantially central portion on the other surface (back surface) of the tongue portion 44*a* is in contact with a dimple 47 provided to protrude at the distal portion of the load beam 38. The pair of outriggers 44*c* are elastically deformed, and the tongue portion 44*a* can be thereby displaced to various directions using the dimple 47 as a fulcrum. As a result, the tongue portion 44*a* and the magnetic head 17 mounted on the tongue portion 44*a* can be displaced in the rolling direction or the pitch direction while flexibly following the surface fluctuation of the magnetic disk 18, and can thereby maintain a narrow gap between the surface of the magnetic disk 16 and the magnetic head 17.

In the gimbal portion 44, the stacked layer member 48 of the flexure 42 is arranged on the metal plate 46 and extends from the proximal portion 44*b* to an upper part of the tongue portion 44*a* along the central axis C1. In other words, the stacked layer member 48 includes a proximal portion 48*a* affixed onto the proximal portion 44*b*, a distal portion 48*b* affixed to the tongue portion 44*a*, and a pair of strip-shaped bridges 48*c* extending in a bifurcating manner from the proximal portion 48*a* to the distal portion 48*b*.

A plurality of connection pads (electrode pads) 54 are aligned in the width direction on the distal portion 48*b*. In addition, a plurality of connection pads (electrode pads) 55 for connecting the piezoelectric elements 50 are provided on the distal portion 48*b*. The stacked layer member 48 includes a plurality of signal lines W1 extending from the connection pads 54 to the proximal portion 48*a* side around both edge portions of the distal portion 48*b*, and a plurality of drive lines W2 extending from the connection pads 55 to the proximal portion 48*a* side. These signal lines W1 and drive lines W2 extend over almost the entire length of the stacked layer member 48 and are connected to the connection pads 43 of the connection end portion 42*c*.

Figure 7:
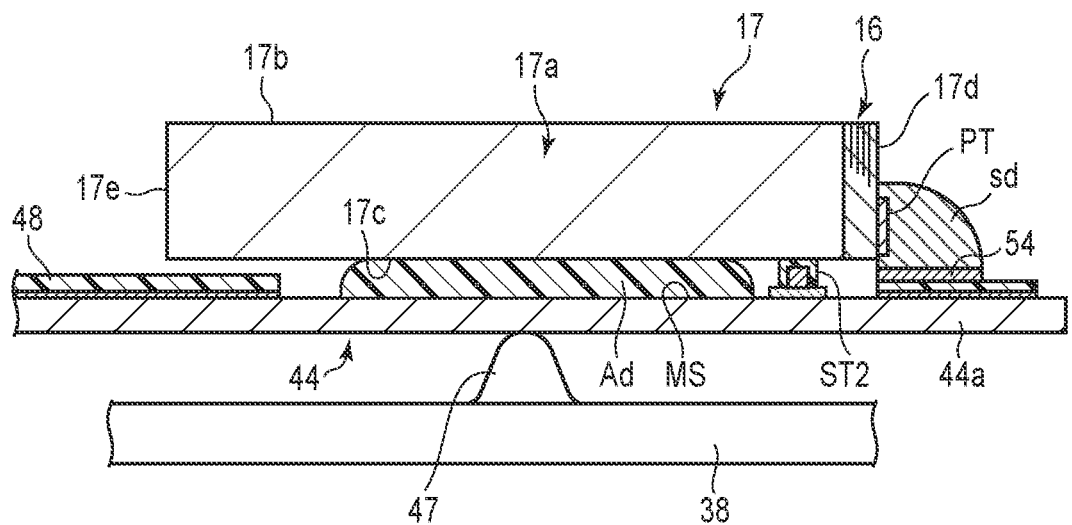
FIG. 7 is a cross-sectional view of the distal portion of the head suspension assembly.

FIG. 7 is a cross-sectional view showing the head-mounted portion at the distal portion of the suspension assembly.

As shown in FIG. 6 and FIG. 7, the magnetic head 17 includes a substantially rectangular head slider 17*a* and a head portion 16 provided on the head slider 17*a*. The head portion 16 includes a recording element (write head), a read element (read head), a heater, and the like, which are constituted by stacking metal films. The head slider 17*a* includes an upper surface (medium-facing surface or air bearing surface (ABS)) 17*b* opposed to the surface of the magnetic disk 18, a back surface (corresponding to a placement surface) 17*c* on the opposite side, an outflow end 17*d* located on the side of the distal portion of the load beam 38, and an inflow end 17*e* located on the side of the proximal portion of the load beam 38. The head portion 16 is provided at the outflow end 17*d* of the head slider 17*a*. The magnetic head 17 includes a plurality of connection pads PT provided at the outflow end 17*d* of the head slider 17*a*. These connection pads PT are electrically connected to the recording elements, the read elements, the heaters, and the like of the head portion 16.

The magnetic head 17 is placed on the tongue portion 44*a* in a state in which the back surface 17*c* of the head slider 17*a* is opposed to the mounted surface MS of the tongue portion 44*a*, and is fixed to the tongue portion 44*a* by an adhesive Ad. The magnetic head 17 is arranged such that a central axis in a longitudinal direction X corresponds to the central axis C of the suspension 34, and a substantially central part of the magnetic head 17 is located on the dimple 47. At the same time, the back surface 17*c* of the head slider 17*a* is in contact with two support protrusions ST1 and ST2, and the head slider 17*a* is supported by the support protrusions ST1 and ST2. In other words, the back surface 17*c* of the slider 17*a* is separated (stands off) from the mounted surface MS by the height of the support protrusions ST1 and ST2. The support protrusions ST1 and ST2 are formed using the first insulating layer, the conductive layer, and the second insulating layer that constitute the stacked layer member (FPC) 48.

The connection pads PT of the magnetic head 17 are electrically connected to the plurality of connection pads 54 of the distal portion 48*b* by means of a conductive adhesive Sd (see FIG. 7) such as solder or silver paste. The magnetic head 17 is thereby connected to the signal lines W1 of the stacked layer member 48 via the connection pads 54.

As shown in FIG. 6, for example, thin film piezoelectric elements (PZT elements) formed in the shape of a rectangular plate are used as the pair of piezoelectric elements 50. The piezoelectric elements 50 are arranged such that their longitudinal direction (expansion and contraction direction) is parallel to the central axis C1 of the suspension 34. The two piezoelectric elements 50 are arranged on both sides of the magnetic head 17 in the width direction Y so as to be parallel to each other. Both of the end portions of each piezoelectric element 50 in the longitudinal direction are mounted and electrically connected to the connection pads 55 of the distal portion 48*b*. The piezoelectric elements 50 are thereby connected to the drive lines W2 of the stacked layer member 48 via the connection pads 55.

Not only the PZT elements, but the other piezoelectric elements may be used as the piezoelectric elements 50. Furthermore, not only the piezoelectric elements, but the other drive elements which can be expanded and contracted by application of current may be used as the drive elements.

Next, the mounting structure of the magnetic heads 17 will be described in detail.

Figure 8A:
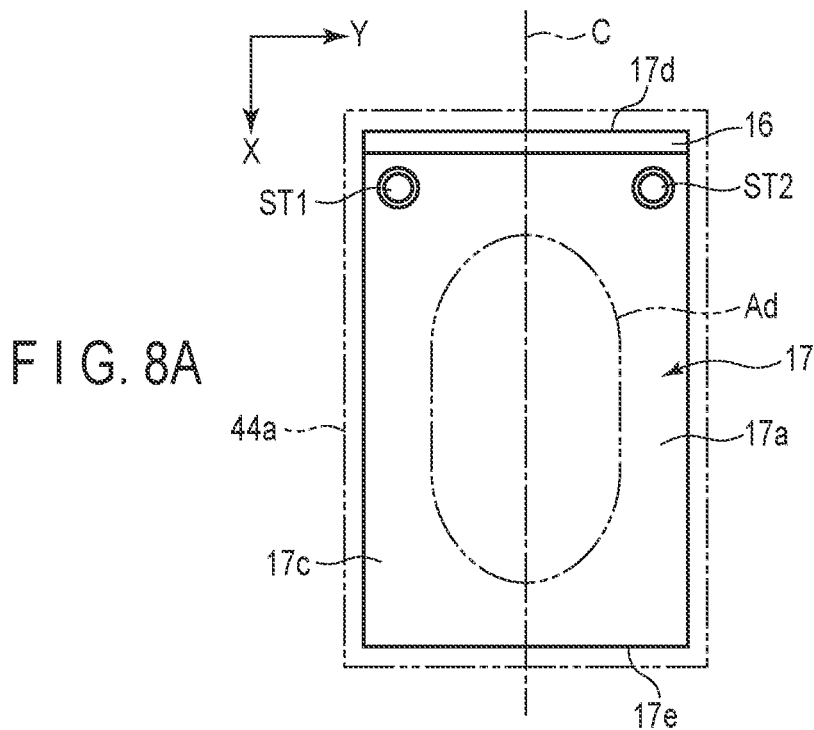
FIG. 8A is a plan view schematically showing a magnetic head and a head support portion.
Figure 8B:
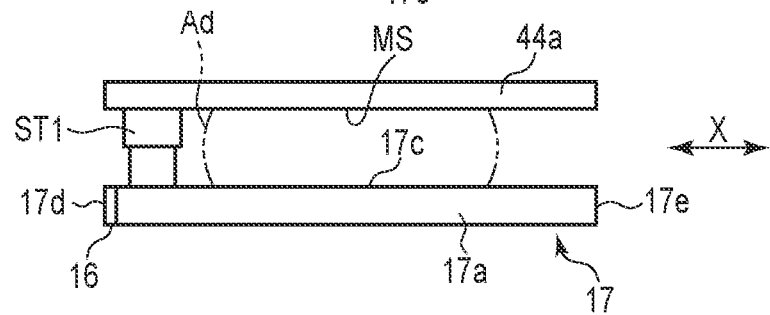
FIG. 8B is a side view showing the magnetic head and head support portion viewed from a Y direction (roll direction).
Figure 8C:
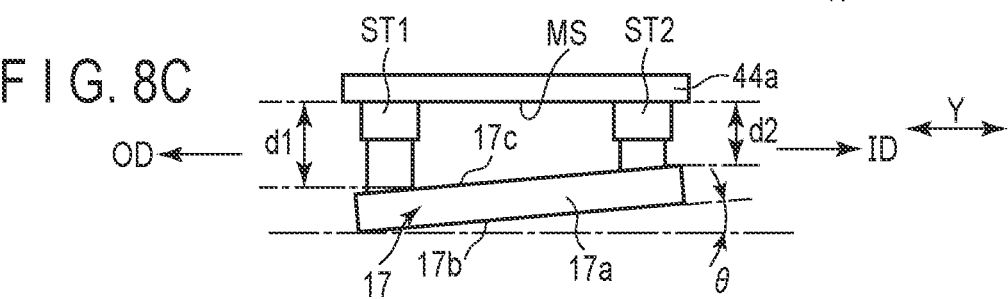
FIG. 8C is a side view showing the magnetic head and the head support portion viewed from an X direction (pitch direction).

FIG. 8A is a plan view schematically showing the magnetic head and the head support portion, FIG. 8B is a side view showing the magnetic head and the head support portion from the Y direction (roll direction), and FIG. 8C is a side view showing the magnetic head and the head support portion from the X direction (pitch direction).

As shown in the drawings, according to the embodiment, two support protrusions ST1 and ST2 are provided on the mounted surface MS of the tongue portion 44*a*. As described above, the support protrusions ST1 and ST2 are formed in, for example, a cylindrical shape, by the same insulation layers and conductive layers as the stacked layer member (FPC) 48.

The support protrusions ST1 and ST2 corresponding to the first support protrusion and the second support portion are provided at positions opposed to two corners on the side of the outflow end 17*d* of the head slider 17*a*. The support protrusions ST1 and ST2 are provided side by side in the width direction Y (roll direction Y) and spaced apart from each other in the width direction Y. The support protrusions ST1 and ST2 are provided on both sides of a central axis C in the width direction Y. Heights (heights in the direction perpendicular to the mounted surface MS) d1 and d2 of the support protrusions ST1 and ST2 are different from each other. The height (second height) d2 of the support protrusion ST2 located on the inward direction ID side is smaller (lower) than the height (first height) d1 of the support protrusion ST1 located on the outward direction OD side (d1>d2). The difference between the heights d1 and d2 (d1−d2) is set to a value that gives a desired tilt angle θ to the head slider 17a.

The magnetic head 17 is placed on the tongue portion 44a in a state in which a back surface 17c is opposed to the mounted surface MS. The two corners on the side of the outflow end 17d of the back surface 17c of the head slider 17a are in contact with the support protrusions ST1 and ST2. In other words, the two corners on the side of the outflow end 17d of the head slider 17a are placed on the support protrusions ST1 and ST2 and are supported by the support protrusions ST1 and ST2. The head slider 17a is adhered to the tongue portion 44a by an adhesive Ad buried between the back surface 17c and the mounted surface MS.

By placing the magnetic head 17 on the support protrusions ST1 and ST2 having the different heights, the head slider 17a and the disk-opposed surface 17b are tilted at the tilt angle θ with respect to a plane parallel to the mounted surface MS of the tongue portion 44a. In other words, the head slider 17a and the disk-opposed surface 17b are tilted at the angle θ in the direction where the end portion on the inward direction ID side approaches the tongue portion 44a, in other words, the end portion on the inward direction ID side is separated from the surface of the magnetic disk 18. The tilt angle θ can desirably be set in a range of −1 to +1 deg and, in one example, set to −0.2 deg.

As a result, when the magnetic head 17 is moved in the inward direction ID and the magnetic head 17 is loaded from the ramp 60 onto the surface of the magnetic disk 18, the risk that the magnetic head 17 may be brought into contact with the surface of the magnetic disk can be reduced remarkably.

As described above, according to the suspension assembly and the HDD of the first embodiment, at least support portions ST1 and ST2 having the different heights are provided on the slider-mounted surface of the suspension. The support protrusions ST1 and ST2 are located at the edge on the inward direction D side and the edge on the outward direction OD side, of the head slider 17a, and have the heights d1 and d2 different from each other. By placing the head slider 17a on the support protrusions ST1 and ST2, the disk-opposed surface of the head slider is tilted at the angle θ in the roll direction with respect to the mounted surface MS. By adjusting the heights of the support protrusions ST1 and ST2, the desired tilt angle θ can be set easily and stably.

In other words, according to the above-described configuration, tilt in the roll direction can be stably provided to the magnetic head 17 by the support protrusions without bending a part of the suspension, for example, the tongue portion. As a result, when the magnetic head 17 is loaded on the surface of the magnetic disk 18, the risk that the magnetic head 17 may be brought into contact with the surface of the magnetic disk can be reduced and the reliability of the HDD can be improved.

Based on the above, according to the embodiment, a suspension assembly capable of stably providing the tilt of the magnetic head and a disk device comprising the suspension assembly can be obtained.

Next, the magnetic head mounting structure of the suspension assembly of the HDD according to other embodiments of this invention will be described. In the other embodiments described below, the same constituent elements as those of the first embodiment will be denoted by the same reference numerals as the first embodiment, their detailed description will be omitted or simplified, and only constituent elements different from the first embodiment will be mainly described in detail.

For example, in the magnetic head mounting structure, the shape, number of installation, installation position, and the like of the support protrusions are not limited to the above-described first embodiment, but can be variously changed as described below.

Second Embodiment

FIG. 9A is a plan view schematically showing a magnetic head and a head support portion of an HDD according to the second embodiment, FIG. 9B is a side view showing the magnetic head and the head support portion from a Y direction (roll direction), and FIG. C is a side view showing the magnetic head and the head support portion from an X direction (pitch direction).

As shown in the drawings, in the second embodiment, two support protrusions ST1 and ST2 erected on a mounted surface MS of a tongue portion 44a are each formed in a shape of an elongated square column. One support protrusion ST1 is provided at a position opposed to a vicinity of an outflow end 17d of a head slider 17a. The support protrusion ST1 extends in the width direction (roll direction) Y and extends from a vicinity of a side edge of the head slider 17a on an outward direction OD side to a vicinity of a side edge on an inward direction ID side. In addition, in the support protrusion ST1, a height d1 of an end portion (first area) ea on the outward direction OD side is different from a height d2 of an end portion (second area) eb on the inward direction ID side. In other words, the height d2 of the end portion eb is smaller (lower) than the height d1 of the end portion ea (d1>d2). A support surface (upper end surface) of the support protrusion ST1 is thereby tilted at a predetermined angle θ in the roll direction Y.

The other support protrusion ST2 is located at a position opposed to the vicinity of an inflow end 17e of the head slider 17a. The support protrusion ST2 extends in the width direction (roll direction) Y and extends from the vicinity of the side edge of the head slider 17a on the outward direction OD side to the vicinity of the side edge on the inward direction ID side. In addition, in the support protrusion ST2, the height d1 of the end portion (first area) ea on the outward direction OD side is different from the height d2 of the end portion (second area) eb on the inward direction ID side. The height d2 of the end portion eb is smaller (lower) than the height d1 of the end portion ea (d1>d2). A support surface (upper end surface) of the support protrusion ST2 is thereby tilted at a predetermined angle θ in the roll direction Y. Incidentally, the heights d1 and d2 of the support protrusion ST1 and the heights d1 and d2 of the support protrusion ST2 are formed to be the same.

The magnetic head 17 is placed on the tongue portion 44a in a state in which a back surface 17c is opposed to the mounted surface MS. The end portion on the outflow end 17d side and the end portion on the inflow end 17e side, of the back surface 17c of the head slider 17a, are in contact with upper end surfaces of the support protrusions ST1 and ST2, respectively. In other words, the end portions on the outflow side and the inflow side of the head slider 17a are placed on the support protrusions ST1 and ST2 and are supported by the support protrusions ST1 and ST2. Furthermore, the head slider 17a is adhered to the tongue portion 44a by an adhesive Ad buried between the back surface 17c and the mounted surface MS.

By placing the head slider 17a on the tilted upper end surfaces of the support protrusions ST1 and ST2, the head slider 17a and the disk-opposed surface 17b are tilted at the tilt angle θ with respect to a plane parallel to the mounted surface MS of the tongue portion 44a. In other words, the head slider 17a and the disk-opposed surface 17b are tilted at the angle θ in the direction where the end portion on the inward direction ID side approaches the tongue portion 44a, in other words, the end portion on the inward direction ID side is separated from the surface of the magnetic disk 18.

In the second embodiment, the other constituent elements of the HDD are the same as those of the HDD according to the first embodiment. Then, the same advantages as those of the above-described first embodiment can also be obtained in the second embodiment using the columnar support protrusions which extend in the width direction Y.

Third Embodiment

Figure 10A:
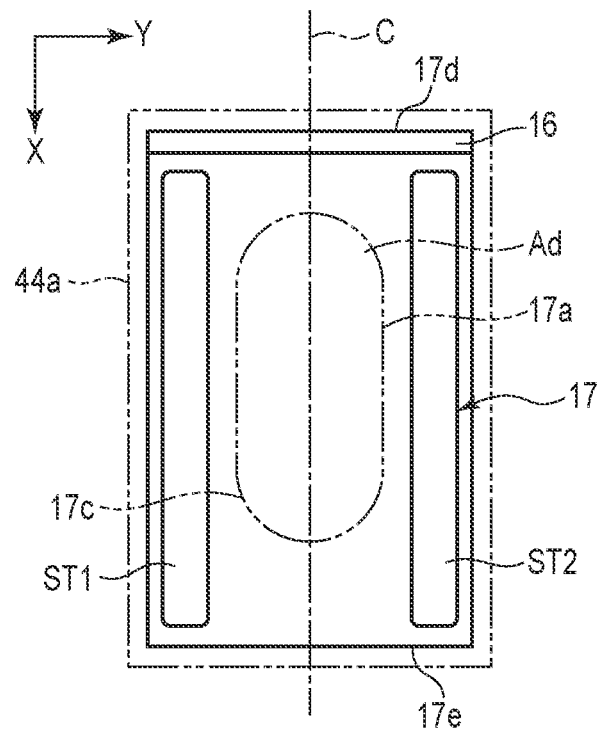
FIG. 10A is a plan view schematically showing a magnetic head and a head support portion of an HDD according to a third embodiment.
Figure 10B:
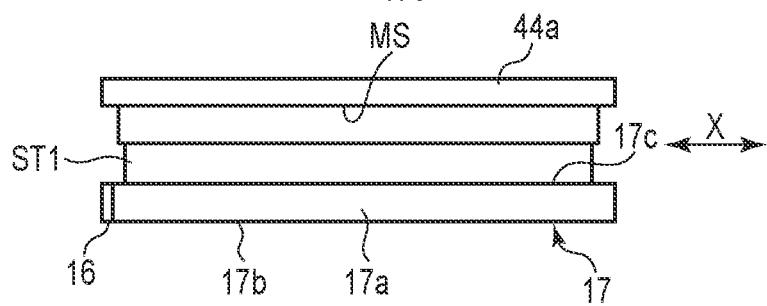
FIG. 10B is a side view showing the magnetic head and the head support portion viewed from the Y direction (roll direction).
Figure 10C:
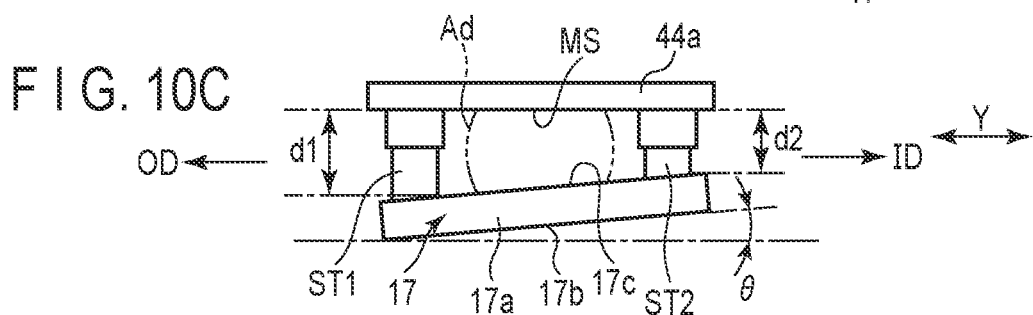
FIG. 10C is a side view showing the magnetic head and the head support portion viewed from the X direction (pitch direction).

FIG. 10A is a plan view schematically showing a magnetic head and a head support portion of an HDD according to the third embodiment, FIG. 10B is a side view showing the magnetic head and the head support portion from a Y direction (roll direction), and FIG. 10C is a side view showing the magnetic head and the head support portion from an X direction (pitch direction).

As shown in the drawings, in the third embodiment, two support protrusions ST1 and ST2 erected on a mounted surface MS of a tongue portion 44a are each formed in a shape of an elongated square column. One support protrusion ST1 is provided at a position opposed to a vicinity of a side edge of a head slider 17a on an outward direction OD side. The support protrusion ST1 extends in a longitudinal direction (pitch direction) X and extends from a vicinity of an inflow end 17e of the head slider 17a to a vicinity of an outflow end 17d. In addition, a protrusion height d1 of the support protrusion ST1 is constant over the entire length.

The other support protrusion ST2 is provided at a position opposed to a vicinity of a side edge of the head slider 17a on an inward direction ID side. The support protrusion ST2 extends in the longitudinal direction (pitch direction) X and extends from the vicinity of the inflow end 17e of the head slider 17a to the vicinity of the outflow end 17d. In addition, a protrusion height d2 of the support protrusion ST2 is constant over the entire length.

The height d1 of the support protrusion ST1 is different from the height d2 of the support protrusion ST2. In other words, the height d2 of the support protrusion ST2 is smaller (lower) than the height d1 of the support protrusion ST1 (d1>d2). The difference between the heights d1 and d2 (d1−d2) is set to a value that gives a desired tilt angle θ to the head slider 17a.

The magnetic head 17 is placed on the tongue portion 44a in a state in which a back surface 17c is opposed to the mounted surface MS. The end portion on the outward direction OD side and the end portion on the inward direction ID side, of the back surface 17c of the head slider 17a, are in contact with upper end surfaces of the support protrusions ST1 and ST2, respectively. In other words, the head slider 17a is placed on the support protrusions ST1 and ST2 and is supported by the support protrusions ST1 and ST2. Furthermore, the head slider 17a is adhered to the tongue portion 44a by an adhesive Ad buried between the back surface 17c and the mounted surface MS.

By placing the head slider 17a on the upper end surfaces of the support protrusions ST1 and ST2 having different heights, the head slider 17a and the disk-opposed surface 17b are tilted at the tilt angle θ with respect to a plane parallel to the mounted surface MS of the tongue portion 44a. In other words, the head slider 17a and the disk-opposed surface 17b are tilted at the angle θ in the direction where the end portion on the inward direction ID side approaches the tongue portion 44a, in other words, the end portion on the inward direction ID side is separated from the surface of the magnetic disk 18.

In the third embodiment, the other constituent elements of the HDD are the same as those of the HDD according to the first embodiment. Then, the same advantages as those of the above-described first embodiment can also be obtained in the third embodiment using the columnar support protrusions ST1 and ST2 which extend in the longitudinal direction X.

Fourth Embodiment

Figure 11A:
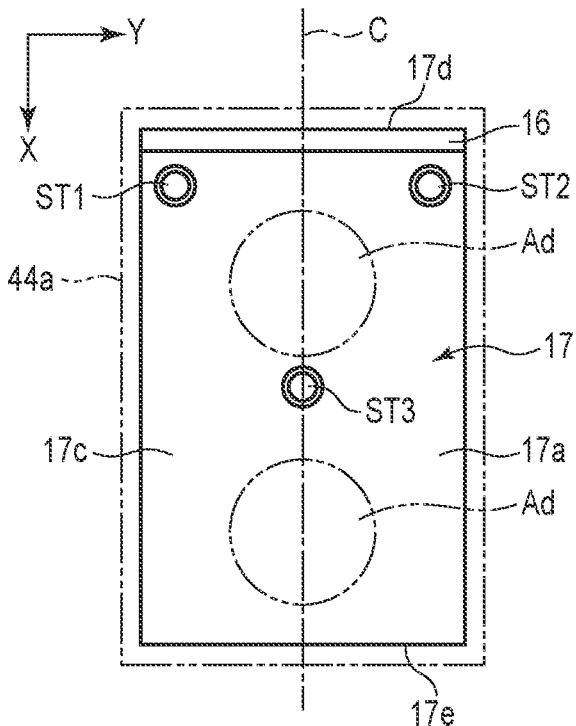
FIG. 11A is a plan view schematically showing a magnetic head and a head support portion of an HDD according to a fourth embodiment.
Figure 11B:
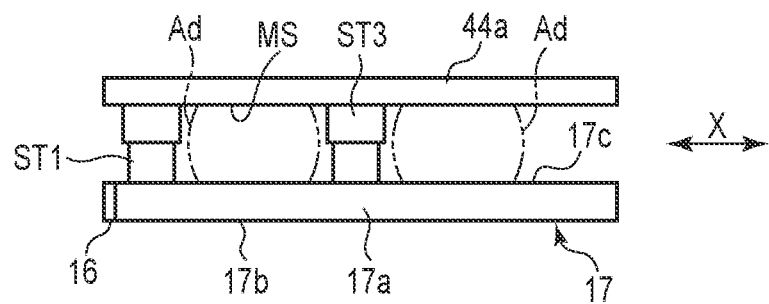
FIG. 11B is a side view showing the magnetic head and the head support portion viewed from a Y direction (roll direction).
Figure 11C:
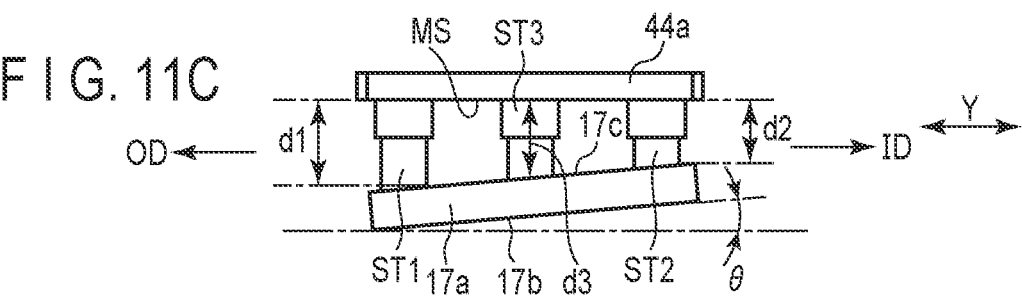
FIG. 11C is a side view showing the magnetic head and the head support portion viewed from an X direction (pitch direction).

FIG. 11A is a plan view schematically showing a magnetic head and a head support portion of an HDD according to the fourth embodiment, FIG. 11B is a side view showing the magnetic head and the head support portion from a Y direction (roll direction), and FIG. 11C is a side view showing the magnetic head and the head support portion from an X direction (pitch direction).

In a mounting structure of the magnetic head, the number of support protrusions is not limited to two, but may be at least one or three or more.

As shown in the drawings, in the fourth embodiment, for example, three columnar support protrusions ST1, ST2, and ST3 are erected on a mounted surface MS of a tongue portion 44a.

The support protrusions ST1 and ST2 are located at positions opposed to two corners on a side of an outflow end 17d of a head slider 17a. The support protrusions ST1 and ST2 are provided side by side in the width direction Y (roll direction Y) and spaced apart from each other in the width direction Y. The support protrusions ST1 and ST2 are provided on both sides of a central axis C in the width direction Y. The support protrusion (third support protrusion) ST3 is provided at a position opposed to the central axis C, in the center of the head slider 17a in the longitudinal direction X.

Heights (heights orthogonal to the mounted surface MS) d1, d2, and d3 of the support protrusions ST1, ST2, and ST3 are different from each other. The height d2 of the support protrusion ST2 located on the inward direction ID side, the height (third height) d3 of the support protrusion ST3 located in the center of the width direction Y, and the height d1 of the support protrusion ST1 located on the outward direction OD side are increased in this order (d1>d3>d2). The difference between the heights d1 and d2 (d1−d2) is set to a value that gives a desired tilt angle θ to the head slider 17a.

The magnetic head 17 is placed on the tongue portion 44a in a state in which a back surface 17c is opposed to the mounted surface MS. The back surface 17c of the head slider 17a is in contact with three support protrusions ST1, ST2, and ST3. In other words, the head slider 17a is placed on the support protrusions ST1, ST2, and ST3 and is supported by the support protrusions ST1, ST2, and ST3. The head slider 17a is adhered to the tongue portion 44a by an adhesive Ad buried between the back surface 17c and the mounted surface MS.

By placing the magnetic head 17 on the support protrusions ST1, ST2, and ST3 having the different heights, the head slider 17a and the disk-opposed surface 17b are tilted at the tilt angle θ with respect to a plane parallel to the mounted surface MS of the tongue portion 44a. In other words, the head slider 17a and the disk-opposed surface 17b are tilted at the angle θ in the direction where the end portion on the inward direction ID side approaches the tongue portion 44a, in other words, the end portion on the inward direction ID side is separated from the surface of the magnetic disk 18.

In the fourth embodiment, the other constituent elements of the HDD are the same as those of the HDD according to the first embodiment. Then, the same advantages as those of the above-described first embodiment can also be obtained in the fourth embodiment. Furthermore, according to the fourth embodiment, the magnetic head can be supported more stably by increasing the number of support protrusions.

Fifth Embodiment

Figure 12A:
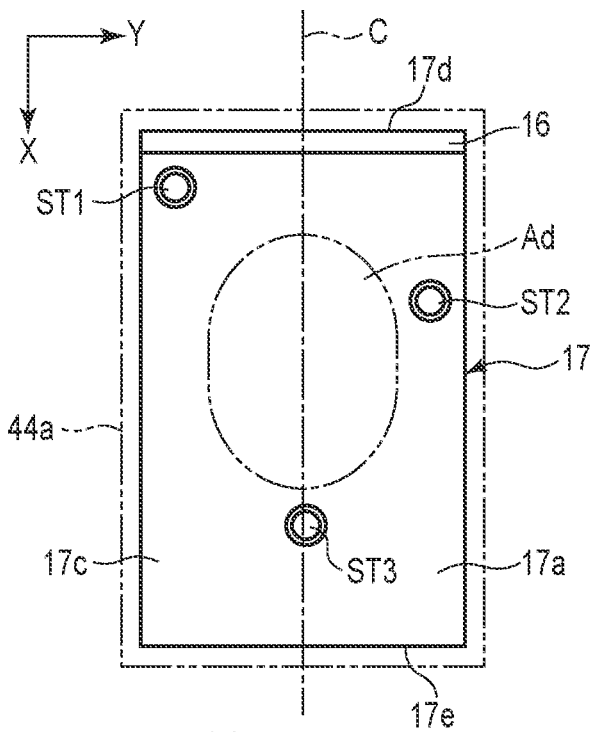
FIG. 12A is a plan view schematically showing a magnetic head and a head support portion of an HDD according to a fifth embodiment.
Figure 12B:
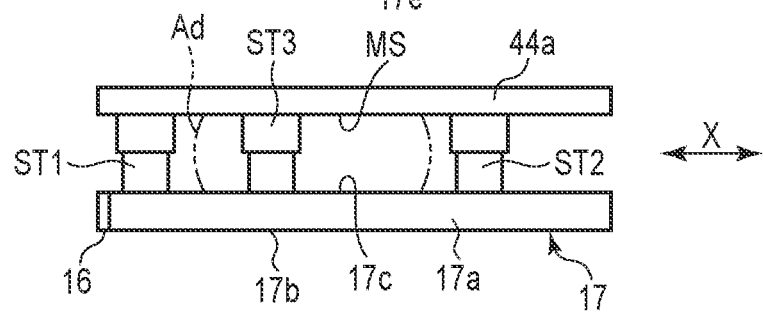
FIG. 12B is a side view showing the magnetic head and the head support portion viewed from a Y direction (roll direction).
Figure 12C:
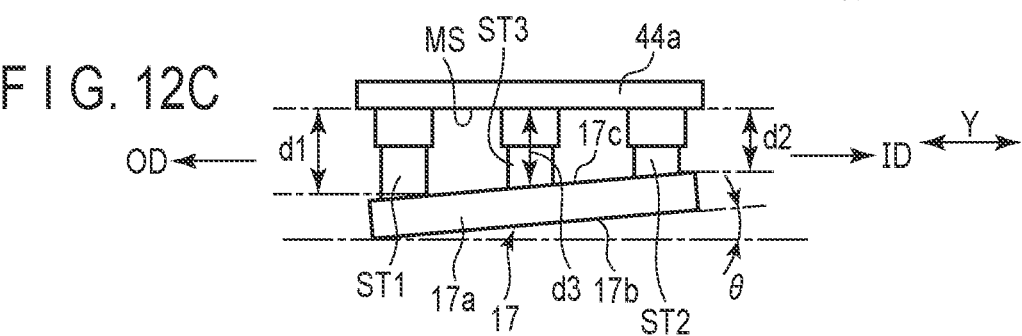
FIG. 12C is a side view showing the magnetic head and the head support portion viewed from an X direction (pitch direction).

FIG. 12A is a plan view schematically showing a magnetic head and a head support portion of an HDD according to the fifth embodiment, FIG. 12B is a side view showing the magnetic head and the head support portion from a Y direction (roll direction), and FIG. 12C is a side view showing the magnetic head and the head support portion from an X direction (pitch direction).

In a mounting structure of the magnetic head, positions of installation of support protrusions can be changed variously.

As shown in the drawings, in the fifth embodiment, for example, three columnar support protrusions ST1, ST2, and ST3 are erected on a mounted surface MS of a tongue portion 44a.

The support protrusions ST1, ST2, and ST3 are displaced from each other in a longitudinal direction X of a head slider 17a. More specifically, the support protrusion ST1 is provided at a position opposed to one corner (outward direction OS side) on a side of an outflow end 17d of the head slider 17a. The support protrusion ST2 is provided at a position opposed to a vicinity of a side edge of the head slider 17a on an inward direction ID side, and spaced at a position spaced apart from the support protrusion ST1 in the longitudinal direction X. The support protrusion ST3 is provided at a position opposed to a central axis C, in the center of the head slider 17a in a width direction Y. The support protrusion ST3 is provided to be spaced apart from the support protrusion ST2 on a side of an inflow end 17e in the longitudinal direction X.

Heights (heights orthogonal to the mounted surface MS) d1, d2, and d3 of the support protrusions ST1, ST2, and ST3 are different from each other. The height d2 of the support protrusion ST2 located on the inward direction ID side, the height d3 of the support protrusion ST3 located in the center of the width direction Y, and the height d1 of the support protrusion ST1 located on the outward direction OD side are increased in this order (d1>d3>d2). The difference between the heights d1 and d2 (d1−d2) is set to a value that gives a desired tilt angle θ to the head slider 17a.

The magnetic head 17 is placed on the tongue portion 44a in a state in which a back surface 17c is opposed to the mounted surface MS. The back surface 17c of the head slider 17a is in contact with three support protrusions ST1, ST2, and ST3. In other words, the head slider 17a is placed on the support protrusions ST1, ST2, and ST3 and is supported by the support protrusions ST1, ST2, and ST3. The head slider 17a is adhered to the tongue portion 44a by an adhesive Ad buried between the back surface 17c and the mounted surface MS.

By placing the magnetic head 17 on the support protrusions ST1, ST2, and ST3 having the different heights, the head slider 17a and the disk-opposed surface 17b are tilted at the tilt angle θ with respect to a plane parallel to the mounted surface MS of the tongue portion 44a. In other words, the head slider 17a and the disk-opposed surface 17b are tilted at the angle θ in the direction where the end portion on the inward direction ID side approaches the tongue portion 44a, in other words, the end portion on the inward direction ID side is separated from the surface of the magnetic disk 18.

Sixth Embodiment

Figure 13A:
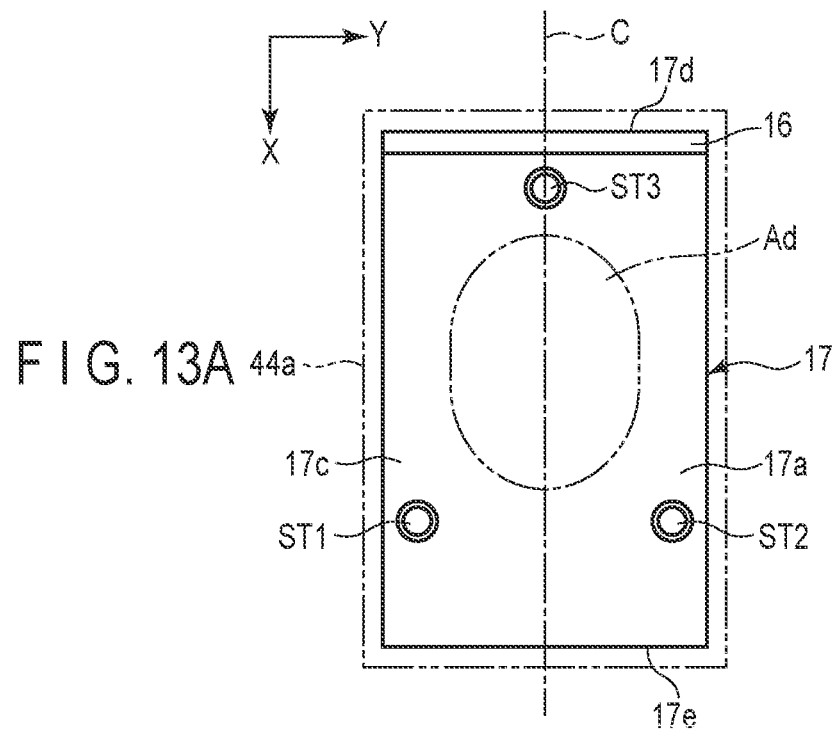
FIG. 13A is a plan view schematically showing a magnetic head and a head support portion of an HDD according to a sixth embodiment.
Figure 13B:
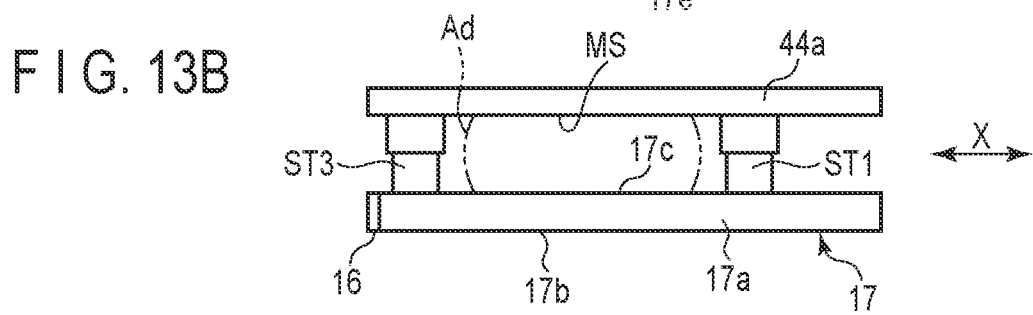
FIG. 13B is a side view showing the magnetic head and the head support portion viewed from a Y direction (roll direction).
Figure 13C:
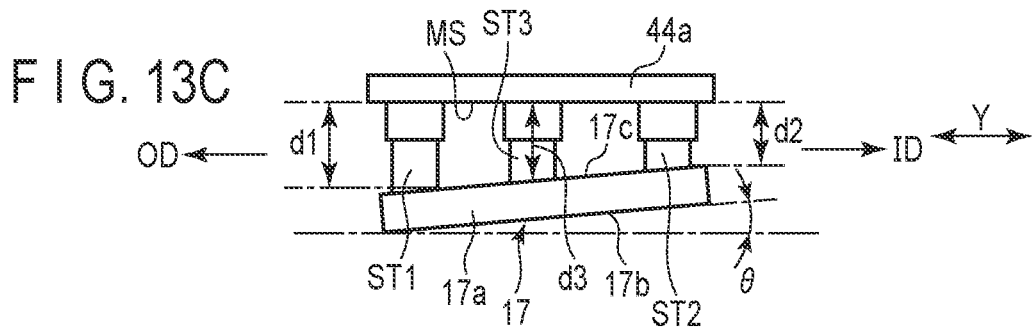
FIG. 13C is a side view showing the magnetic head and the head support portion viewed from an X direction (pitch direction).

In FIG. 13, (a) is a plan view schematically showing a magnetic head and a head support portion of an HDD according to the sixth embodiment, (b) is a side view showing the magnetic head and the head support portion from a Y direction (roll direction), and (c) is a side view showing the magnetic head and the head support portion from an X direction (pitch direction).

As shown in the drawings, in the sixth embodiment, for example, three columnar support protrusions ST1, ST2, and ST3 are erected on a mounted surface MS of a tongue portion 44a.

The support protrusion ST1 is provided in a vicinity of a side edge of the head slider 17a on an outward direction OD side, and is provided at a position displaced from a center of the longitudinal direction X toward an inflow end 17e side. The support protrusion ST2 is provided in a vicinity of a side edge of the head slider 17a on an inward direction ID side, and is provided at a position displaced from the center of the longitudinal direction X toward the inflow end 17e side. The support protrusions ST1 and ST2 are aligned in the width direction (roll direction) Y of the head slider 17a.

The support protrusion ST3 is located on the central axis C in a vicinity of an outflow end 17d of the head slider 17a.

Heights (heights orthogonal to the mounted surface MS) d1, d2, and d3 of the support protrusions ST1, ST2, and ST3 are different from each other. The height d2 of the support protrusion ST2 located on the inward direction ID side, the height d3 of the support protrusion ST3 located in the center of the width direction Y, and the height d1 of the support protrusion ST1 located on the outward direction OD side are increased in this order (d1>d3>d2). The difference between the heights d1 and d2 (d1−d2) is set to a value that gives a desired tilt angle θ to the head slider 17a.

The magnetic head 17 is placed on the tongue portion 44a in a state in which a back surface 17c is opposed to the mounted surface MS. The back surface 17c of the head slider 17a is in contact with three support protrusions ST1, ST2, and ST3. In other words, the head slider 17a is placed on the support protrusions ST1, ST2, and ST3 and is supported by the support protrusions ST1, ST2, and ST3. The head slider 17a is adhered to the tongue portion 44a by an adhesive Ad buried between the back surface 17c and the mounted surface MS.

By placing the magnetic head 17 on the support protrusions ST1, ST2, and ST3 having the different heights, the head slider 17a and the disk-opposed surface 17b are tilted at the tilt angle θ with respect to a plane parallel to the mounted surface MS of the tongue portion 44a. In other words, the head slider 17a and the disk-opposed surface 17b are tilted at the angle θ in the direction where the end portion on the inward direction ID side approaches the tongue portion 44a, in other words, the end portion on the inward direction ID side is separated from the surface of the magnetic disk 18.

In the above-described fifth and sixth embodiments, the other constituent elements of the HDD are the same as those of the HDD according to the first embodiment. Then, the same advantages as those of the above-described first embodiment can also be obtained in the fifth and sixth embodiments.

Seventh Embodiment

Figure 14A:
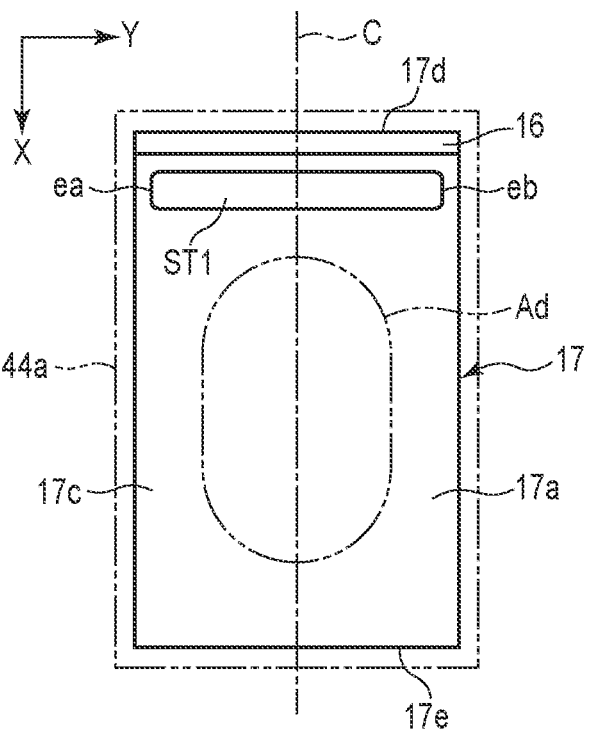
FIG. 14A is a plan view schematically showing a magnetic head and a head support portion of an HDD according to a seventh embodiment.
Figure 14B:
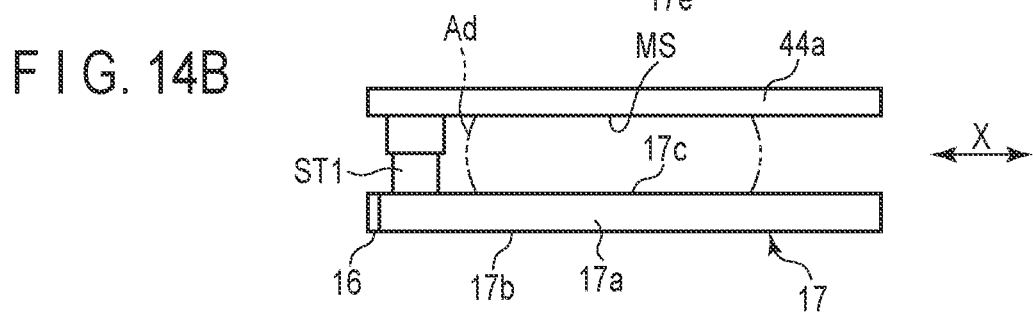
FIG. 14B is a side view showing the magnetic head and the head support portion viewed from a Y direction (roll direction).
Figure 14C:
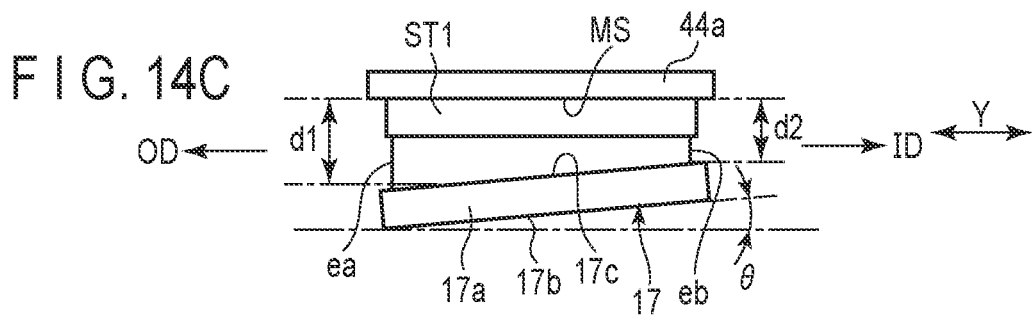
FIG. 14C is a side view showing the magnetic head and the head support portion viewed from an X direction (pitch direction).

FIG. 14A is a plan view schematically showing a magnetic head and a head support portion of an HDD according to the seventh embodiment, FIG. 14B is a side view showing the magnetic head and the head support portion from a Y direction (roll direction), and FIG. 14C is a side view showing the magnetic head and the head support portion from an X direction (pitch direction).

In a supporting structure of the magnetic head, the number of support protrusions is not limited to two or more, but may be at least one.

As shown in the drawings, in the seventh embodiment, one support protrusion ST1 is erected on the mounted surface MS of the tongue portion 44a. The support protrusion ST1 is shaped in, for example, an elongated square column. The support protrusion ST1 is provided at a position opposed to a vicinity of an outflow end 17d of a head slider 17a. The support protrusion ST1 extends in the width direction (roll direction) Y and extends from a vicinity of a side edge of the head slider 17a on an outward direction OD side to a vicinity of a side edge on an inward direction ID side, across a central axis C.

The support protrusion ST1 is formed to include a plurality of areas having different heights. More specifically, in the support protrusion ST1, a height d1 of an end portion (first area) ea on the outward direction OD side is different from a height d2 of an end portion (second area) eb on the inward direction ID side. The height d2 of the end portion eb is smaller (lower) than the height d1 of the end portion ea (d1>d2). A support surface (upper end surface) of the support protrusion ST1 is thereby tilted at a predetermined angle θ in the roll direction Y.

The magnetic head 17 is placed on the tongue portion 44a in a state in which a back surface 17c is opposed to the mounted surface MS. The end portion of the back surface 17c of the head slider 17a on the outflow end 17d side is in contact with the upper end surface of the support protrusion ST1. In other words, the end portion of the head slider 17a on the outflow side is placed on the support protrusion ST1 and is supported by the support protrusion ST1. Furthermore, the head slider 17a is adhered to the tongue portion 44a by an adhesive Ad buried between the back surface 17c and the mounted surface MS.

By placing the head slider 17a on the tilted upper end surface of the support protrusion ST1, the head slider 17a and a disk-opposed surface 17b are tilted at an inclination angle θ with respect to a plane parallel to the mounted surface MS of the tongue portion 44a. The head slider 17a and the disk-opposed surface 17b are tilted at the angle θ in the direction where the end portion on the inward direction ID side approaches the tongue portion 44a, in other words, the end portion on the inward direction ID side is separated from the surface of the magnetic disk 18.

In the seventh embodiment, the other constituent elements of the HDD are the same as those of the HDD according to the first embodiment. Then, the same advantages as those of the above-described first embodiment can also be obtained in the seventh embodiment using the single support protrusion.

Eighth Embodiment

Figure 15A:
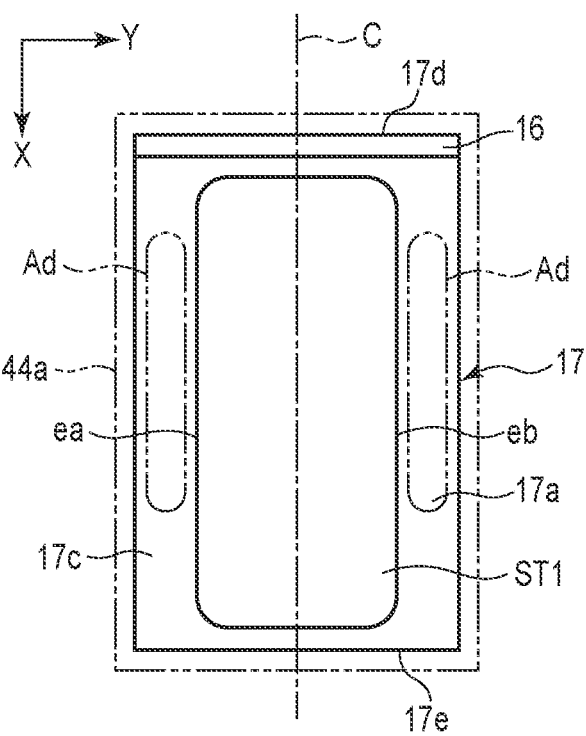
FIG. 15A is a plan view schematically showing a magnetic head and a head support portion of an HDD according to an eighth embodiment.
Figure 15B:
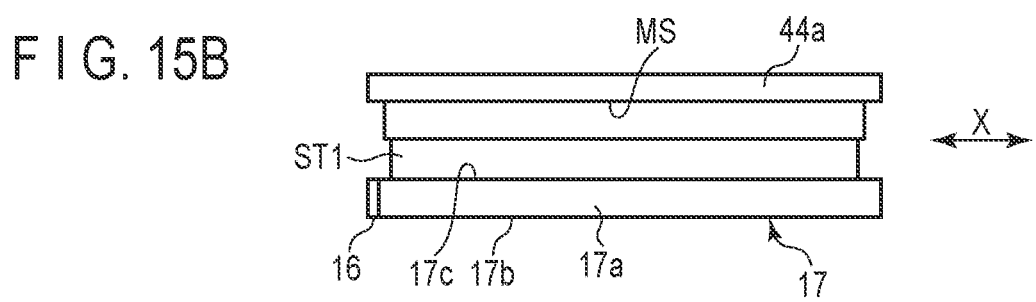
FIG. 15B is a side view showing the magnetic head and the head support portion viewed from a Y direction (roll direction).
Figure 15C:
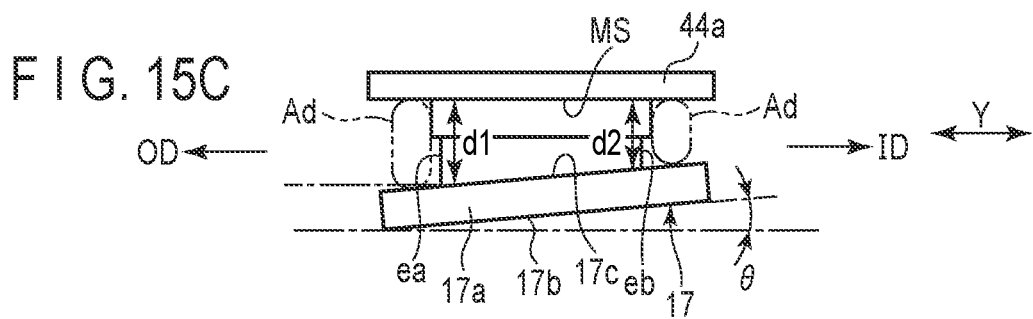
FIG. 15C is a side view showing the magnetic head and the head support portion viewed from an X direction (pitch direction).

FIG. 15A is a plan view schematically showing a magnetic head and a head support portion of an HDD according to the eighth embodiment, FIG. 15B is a side view showing the magnetic head and the head support portion from a Y direction (roll direction), and FIG. 15C is a side view showing the magnetic head and the head support portion from an X direction (pitch direction).

In a supporting structure of the magnetic head, a support protrusion may be formed in a rectangular shape having long sides extending in a longitudinal direction X.

As shown in the drawings, in the eighth embodiment, one support protrusion ST1 is erected on the mounted surface MS of the tongue portion 44a. The support protrusion ST1 is formed in, for example, a rectangular shape. The support protrusion ST1 has a short side located in a vicinity of an outflow end 17d of a head slider 17a and extending in a width direction Y, a short side located in a vicinity of an inflow end 17e and extending in the width direction Y, a long side located in a vicinity of a side edge on an outward direction OD side and extending in a longitudinal direction X, and a long side located in a vicinity of a side edge on an inward direction ID side and extending in the longitudinal direction X. The pair of short sides each extend in a predetermined length in the width direction Y across a central axis C of the head slider 17a.

The support protrusion ST1 is formed to include a plurality of areas having different heights. More specifically, in the support protrusion ST1, a height d1 of an end portion ea on an outward direction OD side is different from a height d2 of an end portion eb on an inward direction ID side. The height d2 of the end portion eb is smaller (lower) than the height d1 of the end portion ea (d1>d2). A support surface (upper end surface) of the support protrusion ST1 is thereby tilted at a predetermined angle θ in the roll direction Y.

In the magnetic head 17, a back surface 17c is placed on the upper end surface of the support protrusion ST1 and supported by the support protrusion ST1. The head slider 17a is adhered to the tongue portion 44a by an adhesive Ad buried between the back surface 17c and the mounted surface MS. By placing the head slider 17a on the tilted upper end surface of the support protrusion ST1, the head slider 17a and the disk-opposed surface 17b are tilted at an inclination angle θ with respect to a plane parallel to the mounted surface MS of the tongue portion 44a.

In the eighth embodiment, the other constituent elements of the HDD are the same as those of the HDD according to the first embodiment. Then, the same advantages as those of the above-described first embodiment can also be obtained in the eighth embodiment using the single support protrusion.

Ninth Embodiment

Figure 16A:
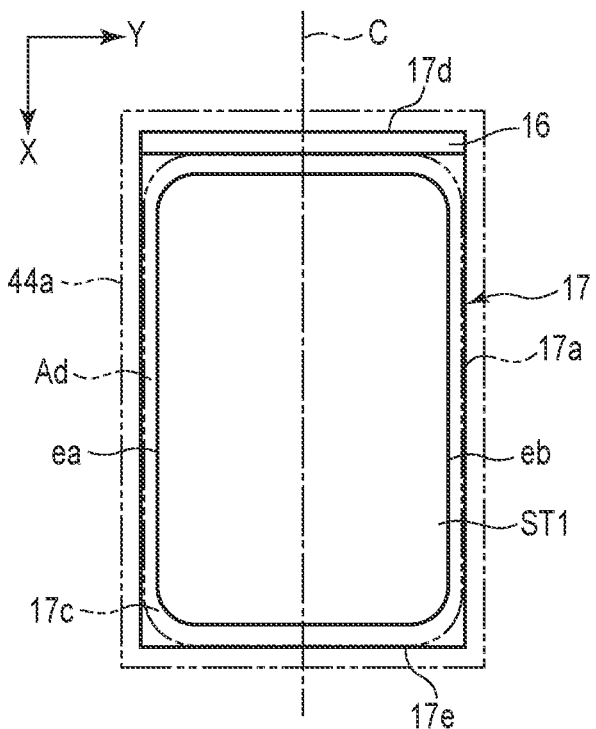
FIG. 16A is a plan view schematically showing a magnetic head and a head support portion of an HDD according to a ninth embodiment.
Figure 16B:
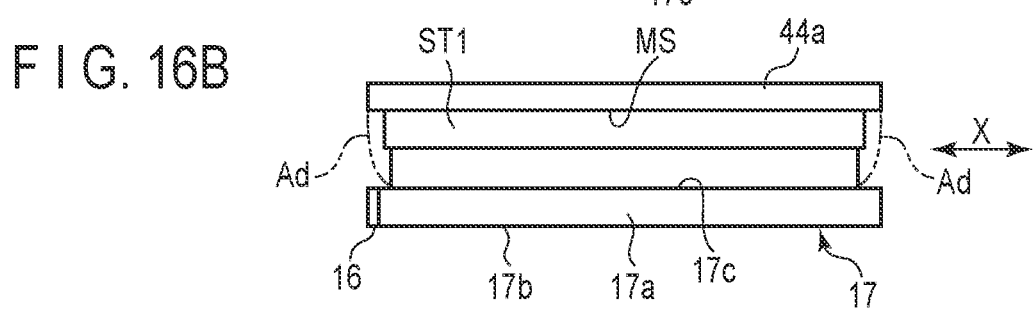
FIG. 16B is a side view showing the magnetic head and the head support portion viewed from a Y direction (roll direction).
Figure 16C:
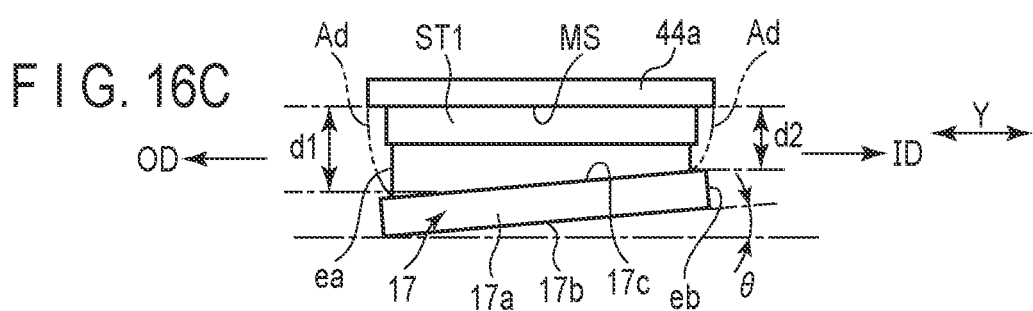
FIG. 16C is a side view showing the magnetic head and the head support portion viewed from an X direction (pitch direction).

FIG. 16A is a plan view schematically showing a magnetic head and a head support portion of an HDD according to the ninth embodiment, FIG. 16B is a side view showing the magnetic head and the head support portion from a Y direction (roll direction), and FIG. 16C is a side view showing the magnetic head and the head support portion from an X direction (pitch direction).

As shown in the drawings, in the eighth embodiment, one support protrusion ST1 provided on a mounted surface MS of a tongue portion 44a is formed in a rectangular shape. The support protrusion ST1 has a width in a width direction Y formed to be larger than the support protrusion ST1 in the above-described eighth embodiment. A pair of long sides of the support protrusion ST1 are thereby located to be adjacent to a pair of side edges of a head slider 17a.

The support protrusion ST1 is formed to include a plurality of areas having different heights. More specifically, in the support protrusion ST1, a height d1 of an end portion ea on an outward direction OD side is different from a height d2 of an end portion eb on an inward direction ID side. The height d2 of the end portion eb is smaller (lower) than the height d1 of the end portion ea (d1>d2). A support surface (upper end surface) of the support protrusion ST1 is thereby tilted at a predetermined angle θ in the roll direction Y.

In the magnetic head 17, a back surface 17c is placed on the upper end surface of the support protrusion ST1 and supported by the support protrusion ST1. The head slider 17a is adhered to the tongue portion 44a by an adhesive Ad buried between the back surface 17c and the mounted surface MS. By placing the head slider 17a on the tilted upper end surface of the support protrusion ST1, the head slider 17a and a disk-opposed surface 17b are tilted at an inclination angle θ with respect to a plane parallel to the mounted surface MS of the tongue portion 44a.

In the ninth embodiment, the other constituent elements of the HDD are the same as those of the HDD according to the first embodiment. Then, the same advantages as those of the above-described first embodiment can also be obtained in the ninth embodiment. Furthermore, according to the ninth embodiment, the area of the support surface (upper end surface) of the support protrusion that supports the head slider 17a can be increased, and the magnetic head can be supported more stably in an inclined state.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The materials, shapes, sizes, etc., of elements which constitute the disk device are not limited to those in the above-described embodiments, and can be changed variously as needed. The shape of the support protrusions is not limited to the column, square column, rectangle, and the like, but other various shapes can be applied. In the disk drive, the number of magnetic disks is not limited to four, but may be three or less or six or more, and the number of suspension assemblies and the number of magnetic heads may also be increased or decreased according to the number of the installed magnetic disks.

What is claimed is:

1. A suspension assembly comprising:
   a support plate with a dimple;
   a wiring member provided on the support plate and including a support portion having a back surface facing the dimple and a head-mount surface opposite to the back surface, and one or more support protrusions provided on the head-mount surface and including a first area having a first height and a second area having a second height smaller than the first height; and
   a magnetic head including a slider having a placement surface and a medium-facing surface opposed to the placement surface and a head portion provided at the slider, the placement surface being placed on the one or more support protrusions and fixed on the head-mount surface with an adhesive provided between the placement surface and the head-mount surface, the medium-facing surface being tilted with respect to the head-mount surface such that a side on the second area is lower than a side on the first area.

2. The suspension assembly of claim 1, wherein
   when a direction parallel to a central axis of the slider is referred to as a longitudinal direction and a direction intersecting the central axis is referred to as a width direction, the first area and the second area of the one or more support protrusions are located on both sides of the central axis, respectively, in the width direction.

3. The suspension assembly of claim 2, wherein
   the one or more support protrusions include a first support protrusion forming the first area and a second support protrusion forming the second area.

4. The suspension assembly of claim 3, wherein
   the first support protrusion and the second support protrusion are arranged side by side in the width direction.

5. The suspension assembly of claim 3, wherein
   the first support protrusion and the second support protrusion are arranged to be spaced apart from each other in the longitudinal direction.

6. The suspension assembly of claim 3, wherein
   the one or more support protrusions further include a third support protrusion provided between the first support protrusion and the second support protrusion in the width direction, and the third support protrusion has a third height smaller than the first height and larger than the second height.

7. The suspension assembly of claim 2, wherein
   the one or more support protrusions include a first support protrusion in a columnar shape including an end portion forming the first area and an other end portion of the first support protrusion forming the second area, and extending in the width direction across the central axis.

8. The suspension assembly of claim 7, wherein
   the one or more support protrusions include a second support protrusion in a columnar shape including an end portion forming the first area and an other end portion of the second support protrusion forming the second area, and extending in the width direction across the central axis, and
   the second support protrusion and the first support protrusion are arranged to be spaced apart from each other in the longitudinal direction.

9. The suspension assembly of claim 7, wherein
   the first support protrusion includes a pair of long sides each extending in the longitudinal direction and a pair of short sides each extending in the width direction.

10. A disk drive comprising:
    a disk-shaped recording medium; and
    the suspension assembly of claim 1.

11. The disk drive of claim 10, wherein
    when a direction parallel to a central axis of the slider is referred to as a longitudinal direction and a direction intersecting the central axis is referred to as a width direction, the first area and the second area of the one or more support protrusions are located on both sides of the central axis, respectively, in the width direction.

12. The disk drive of claim 11, wherein the one or more support protrusions include a first support protrusion forming the first area and a second support protrusion forming the second area.

13. The disk drive of claim 12, wherein the first support protrusion and the second support protrusion are arranged side by side in the width direction.

14. The disk drive of claim 12, wherein the first support protrusion and the second support protrusion are arranged to be spaced apart from each other in the longitudinal direction.

15. The disk drive of claim 12, wherein the one or more support protrusions further include a third support protrusion provided between the first support protrusion and the second support protrusion in the width direction, and the third support protrusion has a third height smaller than the first height and larger than the second height.

* * * * *